United States Patent
Weinberger et al.

(10) Patent No.: US 6,453,389 B1
(45) Date of Patent: Sep. 17, 2002

(54) OPTIMIZING COMPUTER PERFORMANCE BY USING DATA COMPRESSION PRINCIPLES TO MINIMIZE A LOSS FUNCTION

(75) Inventors: Marcelo Weinberger, San Jose; Tomas G. Rokicki, Palo Alto; Gadiel Seroussi, Cupertino; Rajiv Gupta, Los Altos, all of CA (US); Neri Merhav, Haifa (IL); Joesp M. Ferrandiz, Palo Alto, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/340,279

(22) Filed: Jun. 25, 1999

(51) Int. Cl.[7] .............................................. G06F 12/00
(52) U.S. Cl. ........................................ 711/137; 711/213
(58) Field of Search ............................... 711/118, 137, 711/213; 712/235, 207, 238, 230, 237

(56) References Cited

U.S. PATENT DOCUMENTS

| | | | |
|---|---|---|---|
| 4,464,650 A | | 8/1984 | Eastman et al. |
| 5,193,056 A | | 3/1993 | Boes |
| 5,243,341 A | | 9/1993 | Seroussi et al. |
| 5,305,389 A | | 4/1994 | Palmer |
| 5,353,419 A | * | 10/1994 | Touch et al. ............... 712/235 |
| 5,389,922 A | | 2/1995 | Seroussi et al. |
| 5,485,609 A | | 1/1996 | Vitter et al. |
| 5,694,568 A | | 12/1997 | Harrison, III et al. |
| 5,761,468 A | * | 6/1998 | Emberson ................. 712/207 |
| 5,778,423 A | * | 7/1998 | Sites et al. ................. 711/118 |
| 5,778,435 A | * | 7/1998 | Berenbaum et al. ........ 711/137 |
| 5,778,436 A | * | 7/1998 | Kedem et al. ............. 711/137 |
| 5,794,027 A | * | 8/1998 | Grohoski et al. ........... 712/238 |
| 5,822,790 A | * | 10/1998 | Mehrotra .................... 711/213 |
| 6,076,158 A | * | 6/2000 | Sites et al. ................. 712/230 |
| 6,119,222 A | * | 9/2000 | Shiell et al. ............... 712/238 |
| 6,167,509 A | * | 12/2000 | Sites et al. ................. 712/237 |

OTHER PUBLICATIONS

Ziv, Jacob and Lempel, Abraham, *A Universal Algorithm for Sequential Data Compression*, IEEE Transactions on Information Theory, vol. IT–23, No. 3, pp. 337–343, May 1977.

Ziv, Jacob and Lempel, Abraham, *Compression of Individual Sequences via Variable–Rate Coding*, IEEE Transactions on Information Theory, vol. IT–24, No. 5, pp. 530–536, Sep. 1978.

(List continued on next page.)

*Primary Examiner*—David Hudspeth
*Assistant Examiner*—Fred F. Tzeng

(57) ABSTRACT

The method of prefetching data into cache to minimize CPU stall time uses a rough predictor to make rough predictions about what cache lines will be needed next by the CPU. The address difference generator uses the rough prediction and the actual cache miss address to determine the address difference. The prefetch engine builds a data structure to represent address differences and weights them according to the accumulated stall time produced by the cache misses given that the corresponding address is not prefetched. This stall time is modeled as a loss function of the form:

$$L = \sum_{j=0}^{n} L(x_j)$$

$$L(x_j) = \sum_{i=0}^{sl(j)-1} C_i(b_{j-i}, x_j)$$

The weights in the data structure change as the prefetch engine learns more information. The prefetch engine's goal is to predict the cache line needed and prefetch before the CPU requests it.

68 Claims, 20 Drawing Sheets

OTHER PUBLICATIONS

Merhav, Neri and Feder, Meir *Universal Schemes for Sequential Decision from Individual Data Sequences*, IEEE Transactions on Information Theory, vol. 39, No. 4, pp. 1280–1292, Jul. 1993.

Joseph, Doug and Grunwald, Dirk, *Prefetching using Markov Predictors*, 1997 Proceedings of the International Symposium on Computer Architecture (ISCA'97), Jun. 1997, Denver, Colorado.

Even, Shimon, *Four value–adding Algorithms*, IEEE Spectrum, pp. 33–38, May 1998.

* cited by examiner

OPTIMIZING COMPUTER PERFORMANCE BY USING DATA COMPRESSION PRINCIPLES TO MINIMIZE A LOSS FUNCTION

BACKGROUND OF THE INVENTION

1. Field of the Invention

This invention relates generally to computer system optimization and, more particularly, to data prefetching methods and apparatus using data compression principles for prefetching data into cache.

2. Description of the Related Art

Prefetching data into cache is one approach to preventing Central Processing Unit (CPU) stalls in modern computer systems. Cache is a relatively small high-speed random access memory that is paged out of main memory and holds the instructions and data most likely to be accessed in the future. When the processor issues an instruction, data is fetched from memory. If the data is not in the cache, a request is made to the main memory to fetch the data. If the slower main memory is accessed, the computer system slows down, causing the CPU to stall.

Prefetching involves a prediction process: given a current memory state, the prefetch hardware determines a future referenced memory address and stores the predicted future reference in fast memory, e.g., cache. By doing so, accesses to the slower main memory are minimized, preventing CPU stalls and improving the overall speed of the computer system.

Several prefetching approaches have been developed over the years. One class of prefetching approaches is termed fixed prefetching. Fixed prefetching involves fetching a fixed function of the sequence of past misses. Examples of fixed prefetching algorithms include stride predictors and stream buffers. Stride predictors prefetch data references characterized by regular strides or address offsets. Stream buffers are designed to prefetch sequential streams of cache lines independent of program content.

Stride predictors tend to be more accurate than stream buffers. Stream buffers, on the other hand, tend to capture more cache lines and use resources more efficiently. Fixed prefetching algorithms like stride predictors and stream buffers work reasonably well on structured workloads. However, system performance degrades when fixed prefetching is used in combination with dynamically changing workloads.

Another class of prefetching approaches is termed adaptive prefetching. Adaptive prefetching algorithms learn the behavior of a sequence of memory misses and then predict and prefetch data accordingly. An example of adaptive prefetching is described in U.S. Pat. No. 5,485,609 to Vitter et al., issued Jan. 16, 1996, titled "Online Background Predictors and Prefetchers for Locality Management." Vitter teaches an online prediction technique based on data compression principles for prefetching pages from memory. The Vitter prediction technique uses a Lempel-Ziv ("LZ") data compression algorithm to make predictions based on past history and other information available at the time of the prediction.

One disadvantage of the Vitter invention is that it makes predictions over a set of past events, so that it can only predict events seen before: i.e., it cannot predict unknown or never-before-seen events. Moreover, predicting the next most likely event prevents CPU stalls only if the page is prefetched from memory before it is actually requested by the CPU. Thus, CPU time is only partially spared if the CPU's request for data occurs before the data is actually loaded into cache, even if the prediction is accurate.

There are a number of sources for prefetching information, including the address reference stream. Using the address reference stream has the disadvantage of requiring the prefetcher hardware to be located on the same chip as the CPU. Additionally, the prefetcher hardware needs to be highly efficient since the predictor analyzes a large number of references.

Accordingly, a need remains for a prefetch method and apparatus that is accurate, timely, and provides greater coverage. A need also remains for a prefetch method and apparatus that can predict events never before observed and that use the available resources more efficiently, and that can completely prefetch the data before the CPU needs it.

SUMMARY OF THE INVENTION

An embodiment of the present invention includes a prefetch method for prefetching data into cache. The prefetch method is adaptive, but it also includes a fixed stage that generates a rough estimate of the address to be prefetched, which is subsequently refined. The adaptive stage of the prefetch method includes building a dynamic data structure in tree form, the tree having a root, a plurality of internal nodes, a plurality of branches, and a plurality of leaves. The root is also known as the root node, and leaves are also known as external nodes. Within this application, the term "node" generally refers to the root node, internal nodes, and leaves. The branches emanate from the internal nodes and the root; the leaves have no outgoing branches. The root has no incoming branch; each internal node and leaf has exactly one incoming branch. The branches represent address differences between cache misses and rough predictions; each internal node and leaf stores a corresponding weight of its incoming branch. The method traverses the tree so that the current node corresponds to index j. The method receives an address difference at the current node and updates branches from the current node up toward the root of the tree. The method maintains the data structure in a dynamic fashion. New nodes and branches are created and deleted, and weights are updated at various stages during data processing. The method traverses the tree in the direction of the address difference until the method reaches a new current node. The method uses the weights of the branches at the new current node and prefetches data accordingly.

Another aspect of the present invention is its capacity to predict events that have not been seen before.

Another aspect of the present invention is its capacity to prefetch cache lines far enough in advance to prevent CPU stalls, while simultaneously minimizing the cache lines' residency in the prefetch cache. Although Vitter teaches cache line prediction, Vitter does not teach a prediction technique that loads cache lines sufficiently early to completely prevent CPU stalls. For example, Vitter will always tend to predict the next cache line needed. In contrast, the present invention will predict cache lines several steps in advance if so dictated by the memory latency.

Another embodiment of the present invention includes a method for optimizing computer system performance by taking actions that sequentially minimize a total loss function. Here, a "loss" is a quantity whose minimization results in a system performance benefit. For example, some measurement of expected stall time can be taken as a "loss." The total loss L is an accumulation of the losses produced by individual outcomes in accordance with $$L = \sum_{j=0}^{n} L(x_j)$$

$$L(x_j) = \sum_{i=0}^{sl(j)-1} C_i(b_{j-i}, x_j)$$

where $b_{j-i}$ is the $(j-i)^{th}$ action taken, $x_j$ is the $j^{th}$ outcome received, and sl(j) (which may depend on j) is the number of past actions contributing to the loss caused by $x_j$, $sl(j) \leq j$, each action $b_{j-i}$ contributing $C_i(b_{j-i}, x_j)$. For every j, $1 \leq j \leq n$, action $b_j$ may depend on $x_0, x_1, \ldots, x_{j-1}$, but is taken before seeing xj. The possible actions are assumed to be in one-to-one correspondence with the possible outcomes, and for each outcome x there is one (and only one) action b for which $C_i(b, x)=0$. The method constructs a data structure in tree form, the tree having a root, a plurality of internal nodes, a plurality of branches, and a plurality of leaves. The branches emanate from the internal nodes and the root; the leaves have no outgoing branches. The root has no incoming branch; each internal node and leaf has exactly one incoming branch. The branches represent differences between corresponding outcomes $x_j$ and rough predictions $y_j$, where $y_j$ depends on $x_0, x_1, \ldots, x_{j-1}$ through a fixed, predetermined function; each internal node and leaf stores the corresponding weight of its incoming branch. The method traverses the tree so that the current node corresponds to the index j. The method receives an outcome $x_j$ at the current node and updates branches from the current node up toward the root of the tree. The method traverses the tree in the direction of the branch corresponding to outcome $x_j$ until the method reaches a new current node. The method uses the weights of the branches at the new current node and takes an action accordingly. A branch emanating from node j, representing a difference $x_j-y_j$, also represents the action $b_j$ corresponding to outcome $x_j$.

Updating the branch on the tree includes associating the index j to the current node, associating the indices j–i, $0 \leq i < sl$, to the nodes on the path from the root to the current node, and incrementing the weights corresponding to the branches associated with $x_j-y_{j-i}$ at the nodes associated with the indices j–i by an increment amount. The method uses the rough predictor to determine which branches are incremented. Incrementing the weights includes incrementing the weight for one branch at each node j–i, $0 \leq i < sl(j)$, where the branch incremented corresponds to the action b* for which $C_i(b^*, x_j)=0$. Note that the action b* that produces a zero loss for $C_i(b^*, x_j)$ depends on both the outcome $x_j$ and the node j–i; b* can vary for different $x_j$ and different j–i, $0 \leq i < sl(j)$.

Another embodiment of the present invention includes a reset function. In a practical implementation, the amount of storage space available for the nodes in the tree data structure is finite. The system starts with a minimal tree (e.g., just the root, or the root and a small number of nodes), and builds it up as new data (i.e., memory addresses) are processed. Eventually, the tree will grow to fill the available storage space. At that point, the data structure needs to be reset, to allow for further adaptation to new data. The reset function selectively deletes nodes from the data structure. Various reset functions are possible, striking a balance between preserving useful information obtained from past data and allowing growth space for new information.

Another embodiment of the present invention includes a victim cache. A "victim cache" is known in the art as a buffer that contains lines removed from the main cache, often but not necessarily because of associativity limits in the main cache, in the hopes that these lines will be needed again soon. The victim cache thus reduces conflict misses, which makes a cache with low associativity appear to have higher associativity. A victim cache includes "dirty" cache lines: i.e., cache lines containing data that have not been written back to main memory. The prefetch cache can be combined with the victim cache and thus yield benefits of both prefetching and apparent higher associativity simultaneously. When the present invention includes a victim cache, the prefetch method must factor in the time needed to write "dirty" cache lines back to main memory.

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT

According to the present invention, a prefetch method and apparatus speculatively prefetch data into a prefetch cache. Data is prefetched into the prefetch cache when a prefetch engine receives a cache miss from the CPU. The prefetch engine initiates a prefetch loading operation utilizing prior cache miss patterns.

1. System Architecture

Figure 1:
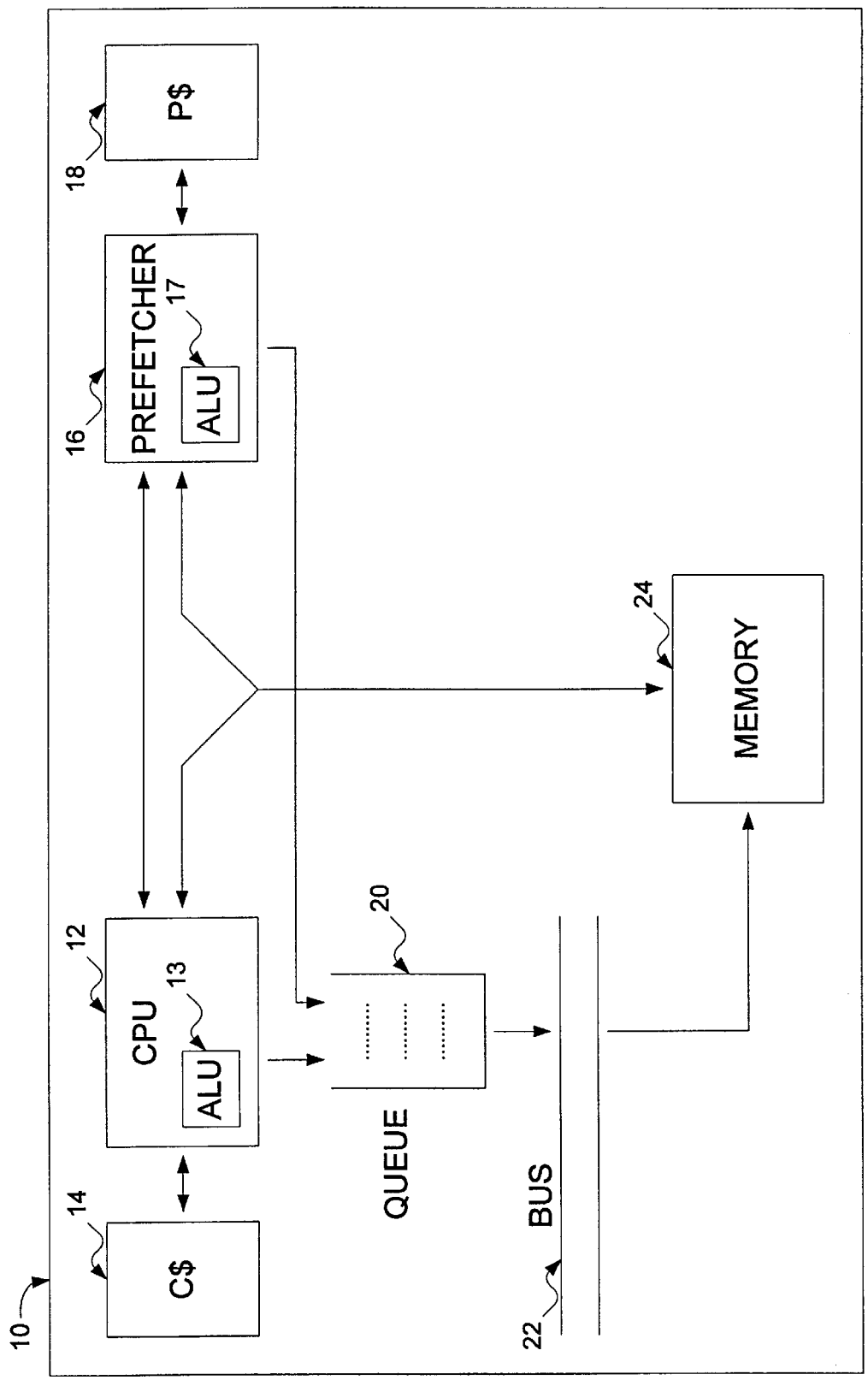
FIG. 1 is a block diagram of an example system architecture for implementing the prediction method and apparatus of the present invention.

A specific embodiment of the invention will now be described with reference to FIG. 1. FIG. 1 is a block diagram of an example system architecture 10 for implementing the prefetch method and apparatus of the present invention. The system architecture 10 includes a Central Processing Unit (CPU) 12, a cache memory 14, a prefetcher 16, a prefetch cache memory 18, a queue 20, a bus 22, and a main memory 24.

The CPU 12 is the primary agent in the system architecture 10. The CPU 12 includes a suitably programmed arithmetic logic unit 13 programmed to manipulate data. The CPU 12 is coupled to the cache 14, the queue 20, the prefetcher 16, and the main memory 24. The CPU 12 initiates substantially all actions in the system architecture 10, including generating memory read misses, memory write misses, and instruction misses.

The prefetcher 16 is the other autonomous agent of the system 10. The prefetcher 16 is a second CPU including a suitably programmed arithmetic logic unit 17. The arithmetic logic unit 17 is programmed to manipulate data. All other agents act only on instruction from the CPU 12 or the prefetcher 16. The prefetcher 16 is coupled to the CPU 12, the main memory 24, the queue 20, and the prefetch cache 18. The prefetcher 16 receives the cache misses issued by the CPU 12 and determines if it can satisfy them to avoid CPU stalls caused by accessing the main memory.

The cache 14 is a small, relatively fast memory for storing and/or buffering data and instructions for later use by the CPU 12. The prefetch cache 18 is a second, small, relatively fast memory for buffering data for the CPU's later use. In the architecture 10, the prefetcher 16 has access to previous cache misses only rather than the whole set of memory addresses.

The queue 20 is coupled between the CPU 12 and the prefetcher 16 on the one side and the bus 22 on the other, and stores requests for addresses from the main memory 24 not yet submitted to the bus 22. Whenever the bus is idle and there is a transaction in the queue 20, a new transaction is scheduled on the bus 22. The queue 20 is modeled as a priority queue: i.e., CPU transactions take priority over prefetcher transactions.

The bus 22 is coupled between the queue 20 and the main memory 24. The bus 22 transmits memory requests stored in the queue 20 to the main memory 24. The bus 22 is modeled as a single server with a constant delay. This is because there is but a single bus 22 attached to the CPU 12 (through the queue 20), and each request takes a fixed, or nearly fixed, time on the bus 22.

The main memory 24 is coupled between the bus 22 on the one side and the CPU 12 and the prefetcher 16 on the other. Generally, the main memory 24 is substantially slower than the cache 14 or the prefetch cache 18. After a request is put on the bus 22 and its bus service time is up (bus residency), the main memory 24 initiates a bus response a fixed time delay later in response to receiving the request (the bus residency plus the fixed time delay is the memory 24 latency T). Thus, the memory model is that of a constant delay with an infinite number of servers. This model is used because most memory systems are built with a large number of banks, and the access time for these banks dominates the memory access time. Multiple banks can be, and are, accessed in parallel. Thus, individual memory banks are seldom a source of contention; most of the delay is in the access phase of the banks themselves. The bus response from the main memory 24 is channeled to the CPU 12, the prefetcher 16, or both, depending on the actor who initiated the request and the memory request merges that occurred before or during the request.

Figure 2A:
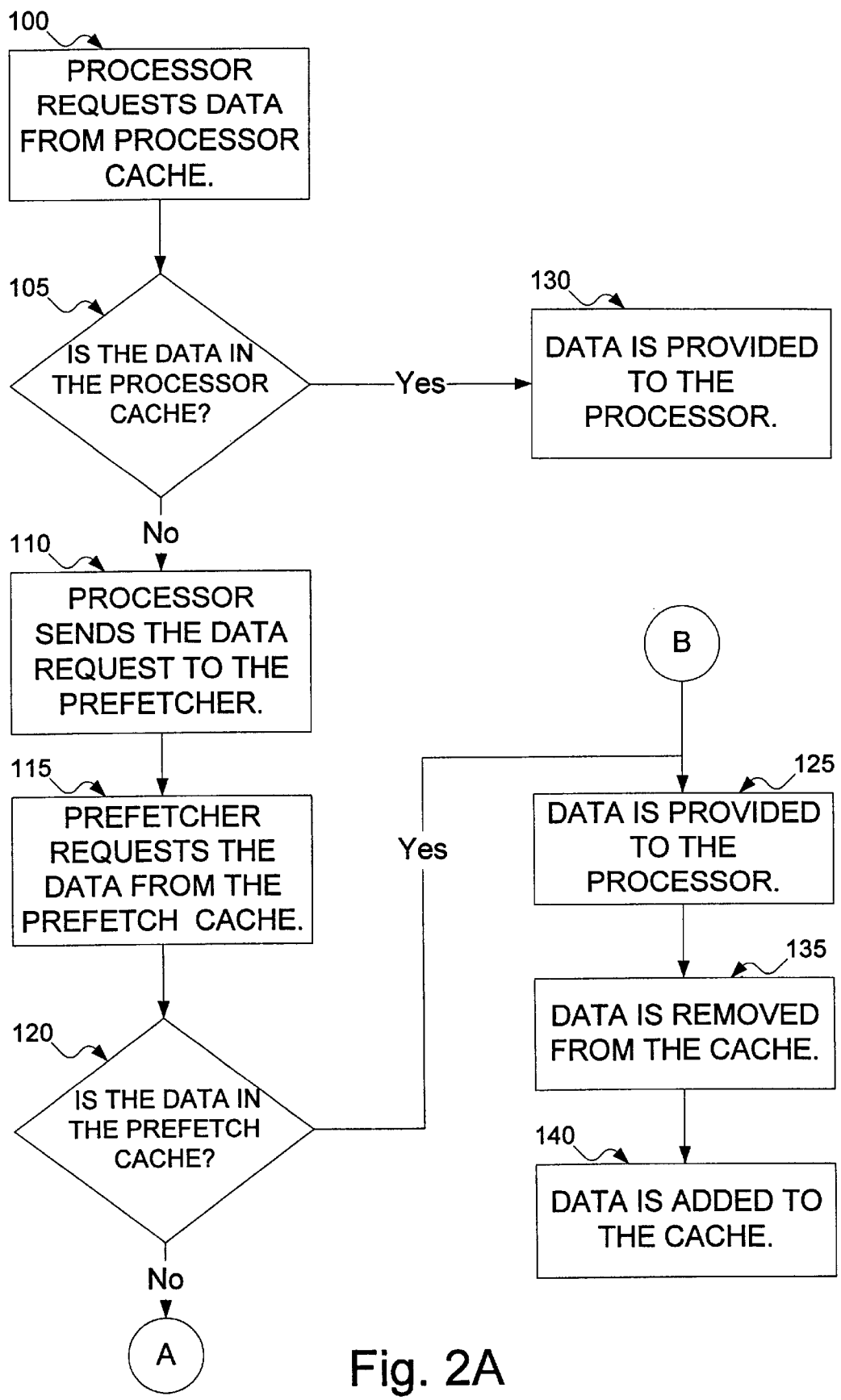
FIG. 2 is a flow diagram of the system architecture shown in FIG. 1.
Figure 2B:
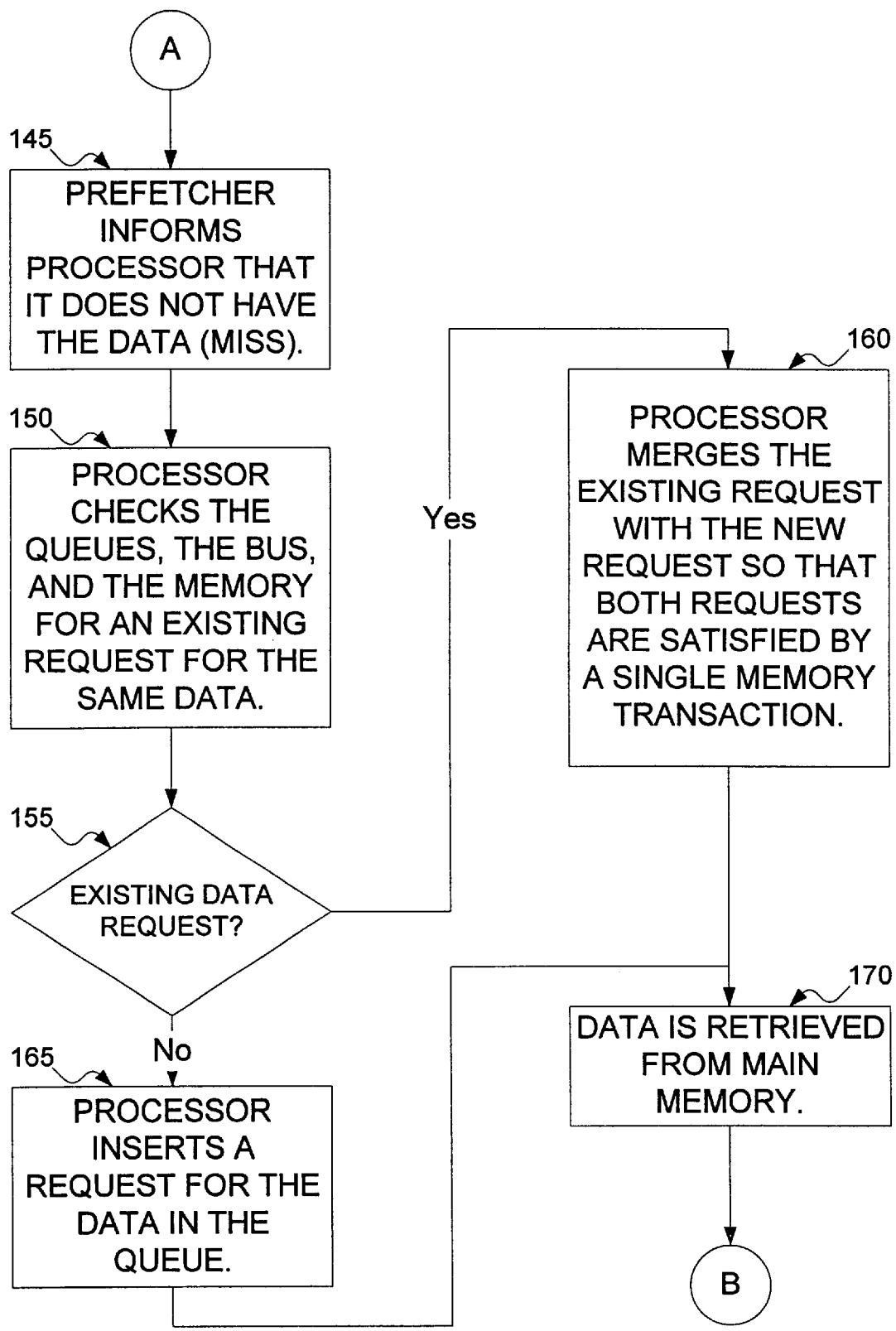

The operation of the system architecture 10 shown in FIG. 1 will be explained in more detail with reference to FIGS. 2A and 2B. FIGS. 2A and 2B are flow diagrams of the system architecture 10. At step 100, the CPU 12 requests a cache line from the cache 14. At step 105, the cache 14 determines whether it has the requested cache line. If the cache 14 stores the requested cache line, the cache line is returned to the CPU 12 at step 130 and the CPU 12 continues with its processing activities. If the cache 14 does not store the requested cache line, the CPU sends the cache line miss to the prefetcher 16 at step 110.

The prefetcher 16 requests the cache line from the prefetch cache 18 (step 115). At step 120, the prefetch cache 18 determines whether it has the requested cache line. If the prefetch cache 18 stores the requested cache line, the cache line is returned to the CPU 12 at step 125. Additionally, the cache line is added to the cache 14 at step 140 after removing an old cache line from the cache 14 at step 135 according to a suitable replacement policy. If the cache line is not stored in the prefetch cache 18, the prefetcher 16 informs the CPU 12 that it does not have the cache line at step 145 by issuing a cache miss.

Thereafter, the CPU 12 checks the queue 20 and the bus 22 for a duplicate cache line request at step 150. If no matching cache line request exists (step 155), the CPU 12 inserts a request for the cache line in the queue 20 (step 165).

If a duplicate cache line request exists, the CPU 12 merges the new request with the existing request in the queue 20 or the bus 22 so that a single memory transaction will satisfy both requests (step 160). At step 170, the cache line is retrieved from main memory 24 and provided to the CPU 12 at step 125.

Figure 3:
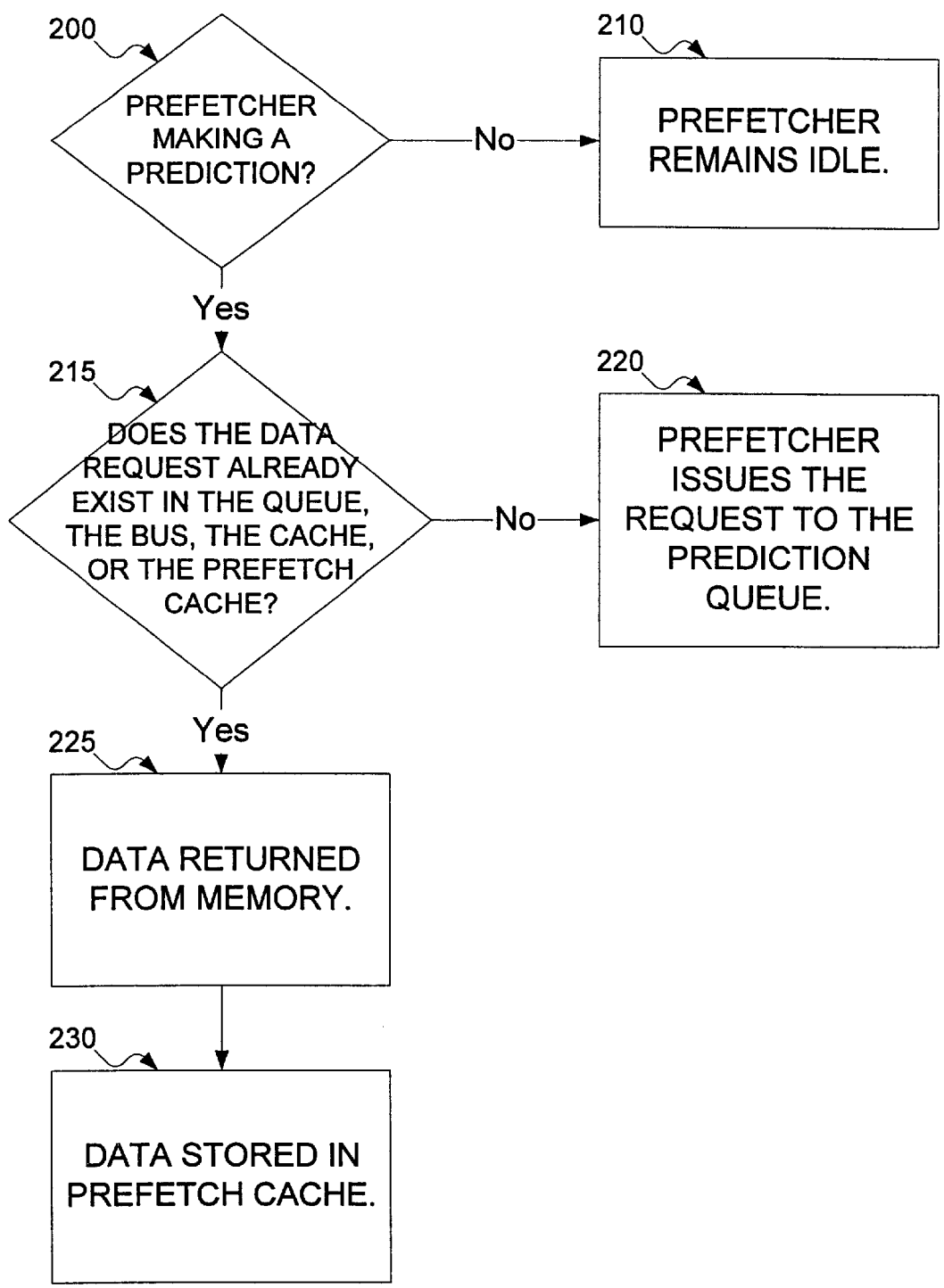
FIG. 3 is a flow diagram of the prefetch engine shown in FIG. 1.

As the CPU 12 makes and processes cache line requests, the prefetcher 16 recognizes patterns in the cache misses and generates predictions of soon-to-be-accessed data. Generally, this works as shown in FIG. 3. As each cache line miss occurs, the prefetcher 16 receives the address miss and computes an address difference for generating a data structure as explained in more detail with reference to FIG. 4. If the prefetcher 16 does not make a prediction at step 200, the prefetcher 16 remains idle at step 210. If the prefetcher 16 makes a prediction at step 200, then at step 215 the prefetcher 16 determines if the predicted cache line is already present in the cache 14 or the prefetch cache 18, or a request for the predicted cache line is already present in the queue 20 or on the bus 22. If neither the predicted cache line nor a request for it is already present, the prefetcher 16 issues a cache line request to the queue 20 at step 220. If a request for the predicted cache line already exists, the cache line is returned from the main memory 24 at step 225 and (provided the CPU 12 did not issue the request) is stored in the prefetch cache 18 at step 230.

As cache lines are inserted in the cache 14 and the prefetch cache 18, old lines—usually lines that have not been used for a while—are replaced using commonly known heuristics. These memory replacements generate memory operations and other transactions themselves. It is possible for the prefetcher 16 to use the prefetch cache 18 as a victim cache. When this happens, any cache line that is cast out of the CPU cache 14 is inserted into the prefetch cache 18 independent of whether the cache line is clean or dirty. Thus, the prefetch cache 18 may contain dirty lines; when these lines are cast out, the prefetcher 16 may generate write-back transactions to memory.

The use of the prefetch cache as a victim cache is synergistic with prefetching, because often the line predicted is the same as one recently cast out of the main cache. In this case, the line already exists in the combined prefetch/victim cache, is ready for immediate use by the CPU, and does not occupy additional bus traffic to perform the prefetch of the predicted line nor the earlier writeback of the same line.

Figure 4:
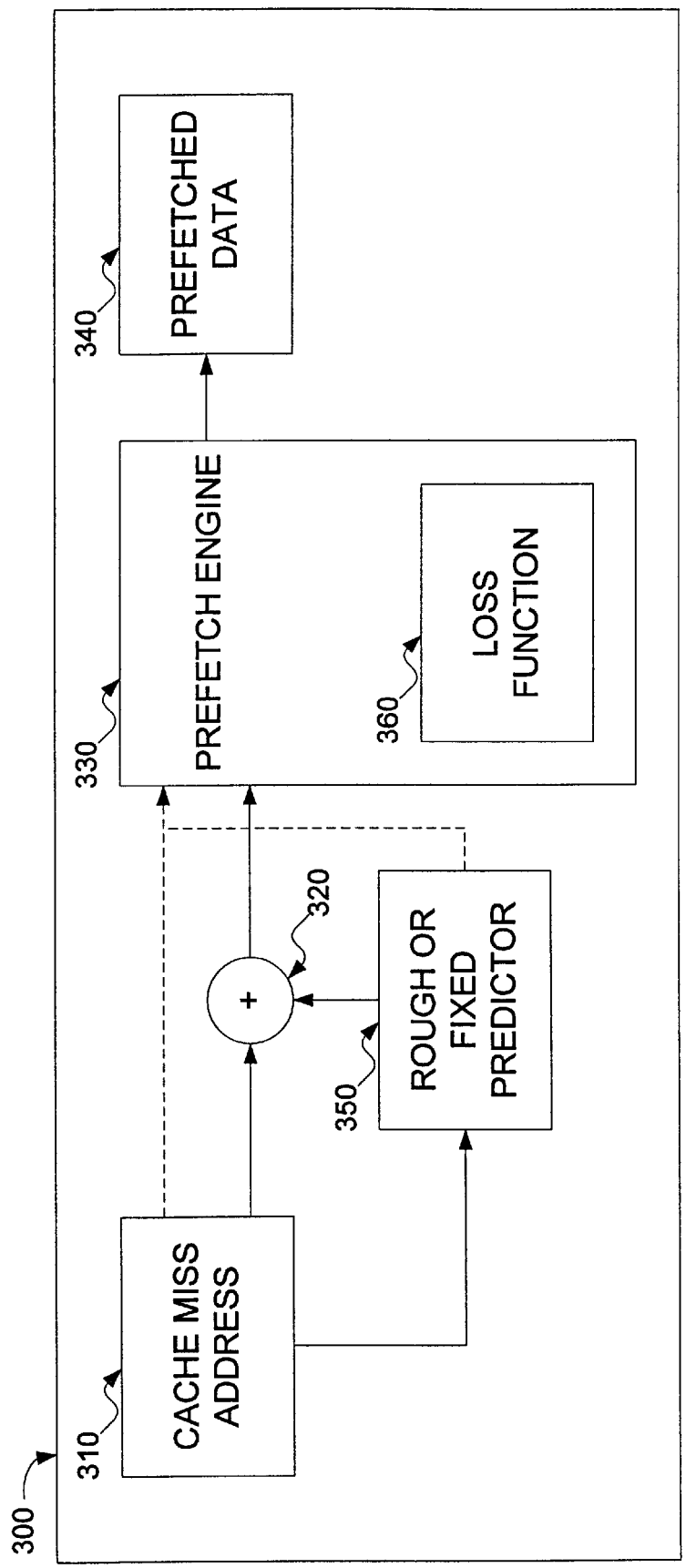
FIG. 4 is a block diagram of the prefetch method and apparatus of the current invention.

FIG. 4 is a block diagram of the apparatus of the current invention. The prefetch apparatus 300 is implemented preferably in prefetcher 16 of the system architecture 10 shown in FIG. 1. The prefetch apparatus 300 operates as follows. The prefetch apparatus 300 receives cache line miss addresses from the CPU 12 and feeds these missed addresses to the fixed or rough predictor 350. The fixed predictor 350 can use any fixed function of previous cache line miss addresses. For example, the fixed predictor 350 can be based on a variety of prediction technologies including low pass filters, MLE, and the like, such as a linear combination of address differences. The fixed predictor 350 can also be selected over a set of linear predictors according to which fixed predictor performed best in the past. The rough predictor 350 introduces prior knowledge about the cache misses that would otherwise need to be learned by an adaptive prefetcher. Fixed prefetching involves fetching a fixed function of the sequence of past misses. For an example of how the prefetch apparatus 300 uses the fixed predictor 350 and the address difference generator 320, see sub-section 3.b, entitled Data Prefiltering, below.

The prefetch engine 330 receives as input the difference between the cache miss address 310 and an address or value predicted by the fixed predictor 350. In the preferred embodiment, the prefetch engine 330 receives the difference between the current cache miss and the cache line that comes right after the previous cache miss. Moreover, the preferred embodiment targets an architecture in which the prefetcher 16 has access to cache misses only (and not to the complete history of memory references). However, the invention works well with an architecture that can access the complete sequence of memory references. In the latter architecture, the issue of data prefiltering using a fixed or a rough predictor 350 is less crucial. The prefetch engine 330 also receives either the cache miss address 310 or the rough prediction generated by the fixed predictor 350. Neither of these is specifically necessary; however, the prefetch engine 330 needs at least one of the two.

The prefetch engine 330 recursively generates a data structure based on an LZ data compression algorithm using the address differences provided by the address difference generator 320 and the rough predictions provided by the rough predictor 350. In the preferred embodiment, the prefetch engine 330 generates a tree that is used both for parsing the input stream of address differences (as in an LZ data compression scheme) and for predicting the address of the data to be prefetched. The tree is generally stored as a set of tables or lists on a storage means included in the prefetch engine 330. The prefetch engine 330 optimizes system performance by minimizing a loss function 360 representative of CPU stall time. The prefetch engine 330 ranks or prioritizes the data on the tree based on past prefetch actions and the loss or CPU stall time caused thereby. As mentioned above, the primary goal of the prefetch engine 330 is not necessarily to predict, prefetch, and store the prefetched data in the prefetch cache 18 by the next CPU cycle but instead to predict, prefetch, and store data in the prefetch cache 18 by the time the CPU 12 requests that data.

As it occurs in the preferred embodiment, a tree is defined as a connected graph without circuits. The tree built by the method consists of nodes and branches. The branches of the tree are directed: they have an origin node and a destination node. The branches correspond to address differences x-y, where x is a cache miss address 310 and y is a rough prediction generated by the rough predictor 350. The nodes store the weight of their incoming branch; the weights are incremented according to the loss contributed by the corresponding address difference x-y for previous prefetch actions. Each node also stores the output from the rough predictor 350 generated the last time the node was current.

A unique node in the tree, called the root node, has no incoming branches. All the other nodes in the tree have exactly one incoming branch. Nodes without an outgoing branch are called external nodes or leaves. Nodes that are neither leaves nor the root are called internal nodes. The root usually defines the null word $\phi$. At any time, one node in the tree is called the current node. The current node is allowed to change over time. The creation of an LZ tree is described in U.S. Pat. No. 4,464,650 to Eastman et al., issued Aug. 7, 1984, titled "Apparatus and Method for Compressing Data Signals and Restoring the Compressed Data Signals," incorporated herein by reference.

2. Loss Functions 360 Within the Prefetch Apparatus 300

The CPU 12 outputs a sequence of cache miss addresses 310 $x"=x_0, x_1, \ldots, x_n$ over a predetermined discrete alphabet. Cache miss $x_j$ occurs at time t'j where j is the index of the cache misses and time is measured in CPU cycles. $t_j$ represents the time of the $j^{th}$ cache miss without regard for stall time due to bus residency or memory latency; $t'_j$ represents the time of the $j^{th}$ cache miss factoring in stall times. Note that the times $t'_j$ are ordered, i.e., $t'_j > t'_{j-1}$, but are not necessarily consecutive. That is, there can be many CPU clock cycles between $t'_j$ and $t'_{j-1}$, during which no cache misses occur. The cache miss addresses 310 are provided to rough predictor 350 and address difference generator 320. The rough predictor 350 makes a rough prediction $y_j$. The address difference generator 320 provides to prefetch engine 330 a sequence of rough prediction errors $x_j-y_j$, where $y_j$ depends on $x_0, x_1, \ldots, x_{j-1}$ through a fixed, predetermined function. Note that $y_0$ depends on none of the $x_j$: the indices of the rough predictions $y_j$ can either start at index 1 (leaving $y_0$ undefined), or an arbitrary address can be assigned to $y_0$. The prefetch engine 330 also receives either the cache miss addresses 310 $x_j$ or the rough predictions $y_j$. Prefetch engine 330 takes an action by to prefetch an address, where j is the index of sequential cache miss addresses, j=1, 2, ..., n. Action $b_j$ occurs at time $t'_{j-1}$, since at this time $x_{j-1}$ is already available. Action $b_0$ can be thought as defining an initial state for the prefetch cache 18. The time measure $t_j$ helps account for cases in which the CPU must stall for data to be loaded from main memory. It measures active CPU clock cycles only: i.e., it excludes cycles in which the CPU is waiting for data to be loaded from main memory. Notice that $(t'_j-t'_{j-1})-(t_j-t_{j-1})$ is the stall time resulting from loading $x_{j-1}$. If this address is readily available, then $t'_j-t'_{j-1}=t_j-t_{j-1}$. Prefetch decisions are made as new information becomes available: i.e., after each cache miss. Assume for simplicity in the description that only one address is prefetched per cache miss.

a. Natural Loss Function

Each outcome $x_i$ has an associated loss $l(b_0, b_1, \ldots, b_i, x_i)$. The natural loss function to be minimized by the prefetch actions $b_0, b_1, \ldots, b_i$ has the following form:

$$\sum_{i=0}^{n} l(b_0, b_1, \ldots, b_i, x_i)$$

The prefetch actions $b_1, b_2, \ldots, b_i$, together with an "initial state" $b_0$ and a suitable replacement policy, determine the state of the prefetch cache 18. The occurrence of $x_i$ after actions $b_0, b_1, \ldots, b_i$ produces a loss $l(b_0, b_1, \ldots, b_i, x_i)$ equal to the CPU stall time caused if $x_i$ is not in present in the cache 14 or the prefetch cache 18 when $x_i$ is requested by the CPU 12. Thus, the natural loss function to minimize for prefetching data in a computer system 10 (FIG. 1) depends on a multiplicity of previous decisions: i.e., it has memory.

The necessity of memory—that the loss caused by $x_i$ is a function of all previous actions $b_0, b_1, \ldots, b_i$, and not just $b_i$ by itself—is a major disadvantage. For this reason, the natural loss function is intractable even assuming an infinite cache and negligible bus residency with respect to memory latency. Such loss functions apply to contexts other than prefetching in which system optimization is important. Here, $x^n=x_0, x_1, \ldots, x_n$ applies to a sequence of outcomes, and $b^n=b_0, b_1, \ldots, b_n$ refers to a sequence of actions.

b. Approximate Loss Function

To circumvent the disadvantageous requirement of memory in the natural loss function, the loss can be approximated as an accumulation of losses with respect to each individual action. In the above approach, each outcome $x_j$ (e.g., a cache miss) produced a loss. In the proposed approach, the contribution of the $(j-i)^{th}$ action to the $j^{th}$ loss is analyzed. The contribution of past action $b_{j-i}$ to the loss caused by the outcome $x_j$ is given by $C_i(b_{j-i}, x_j)$. The contribution of each action $b_{j-i}$ is assumed additive over i. The approximate loss function takes the following form:

Approximate Loss Function $$L(x_j) = \sum_{i=0}^{sl(j)-1} C_i(b_{j-i}, x_j)$$

The total loss is equal to the sum of $L(x_j)$ over the index j. The summation limit sl(j) of actions $b_{j-i}$ contributing to the loss caused by $x_j$, and the individual losses $C_i(b_{j-i}, x_j)$, can depend on side information $t_0, t_1, \ldots, t_n$. In a prefetch system, $t_j$ is the time at which cache miss $x_j$ occurred, measured in active CPU cycles (i.e., excluding stall times). The side information is independent of the actions actually taken. Notice that the times $t'_j$ do not satisfy this condition, as the actions taken affect stall times which, in turn, affect the values $t'_j$. The summation limit sl(j) may or may not depend on j; it is assumed that sl(j)≦j. The losses take the form:

$$C_i(b_{j-i}, x_j) = \begin{cases} 0 & \text{for some } b^*, \text{ a function of } x_j \\ C_i(t_0, t_1, \ldots, t_j) & \text{otherwise (a function of the side infromation)} \end{cases}$$

For a loss function without memory, sl(j)=1 for all j. In this case (for example, in a prediction problem), the action by corresponds to a predicted value, and $$C_0(b_i, x_j) = \begin{cases} 0 & \text{for } b_j = x_j \\ 1 & \text{otherwise} \end{cases}$$

Hereafter, the notation b=x means that action b is to predict (or prefetch, in a prefetching context) address x.

For a particular embodiment of a prefetching system, assume T is the memory latency and m(j) is the maximum index 1 for which $t_j-t_l \leq T$. Then the loss function $L(x_j)$ is defined through $C_i(b_{j-i}, x_j)$ according to the following condition set 1, where the loss measures the savings lost by not prefetching $x_j$ at action $b_{j-i}$.

$$C_i(b_{j-i}, x_j) = \begin{cases} 0 & b_{j-i} = x_j \\ \min(T, t_j - t_{j-i-1}) & \text{otherwise} \end{cases} \quad \text{Condition 1-a}$$

for i such that $j - i - 1 \geq m(j)$

In Condition 1-a, the contribution of action $b_{j-i}$ to the loss caused by $x_j$ is considered "in isolation": i.e., it is assumed that, if $x_j$ is prefetched at all, it is by action $b_{j-i}$, and that the only possible stall time involved results from the occurrence of $x_j$ (hence, the use of the time measure t, rather than t'). If action $b_{j-i}$ equals $x_j$, the correct data was prefetched at time $t_{j-i-1}$. In that case, the loss function is 0. For all other possible actions $b_{j-i}$, there is a loss. For these other actions, if $x_j$ could not have been prefetched in time, the loss is calculated as $t_j-t_{j-i-1}$, as this would be the savings resulting from prefetching at time $t_{j-i-1}$. If $x_j$ could have been prefetched in time, i.e., j−i−1=m(j), then $t_j-t_{j-i-1} \leq T$. In that case, the loss is only the time needed to prefetch $x_j$, or T. This cost analysis "in isolation" neglects the scheduling conflicts that might arise from delays caused by the bus residency, which is usually small with respect to T.

$$C_i(b_{j-i}, x_j) = 0 \text{ for } i \text{ such that } j-i-1<m(j) \quad \text{Condition 1-b}$$

No prefetching is necessary more than T cycles in advance.

In a more general prefetching embodiment, $x_j$ may be prefetched at some time between $t_{j-i-1}$ and $t_j$. In such an embodiment, let k(i, j) be the smallest index greater than or equal to j−i−1 for which $x_j$ was already prefetched (at time $t_{k(i, j)}$), if any (otherwise k(i, j) is equal to j). The loss function $L(x_j)$ is then defined through $C_i(b_{j-i}, x_j)$ according to the following condition set 2.

$$C_i(b_{j-i}, x_j) = t_{k(i, j)} - t_{j-i-1} \text{ for } i \text{ such that } j-i-1<m(j) \quad \text{Condition 2-a}$$

Since i is such that j−i−1>m(j), necessarily $t_j-t_{j-i-1}<T$. Thus, if $x_j$ is prefetched at time $t_{j-i-b\ 1}$, $x_j$ will not arrive on time, but the prefetch will still reduce the stall time by $t_j-t_{j-i}\_1$ with respect to not prefetching $x_j$ at all. However, if $x_j$ is prefetched at time $t_{k(i, j)}$ instead of time $t_j$, then the reduction in stall time is equal to $t_{k(i, j)}-t_{j-i-1}$. If $x_j$ is not prefetched at any time between $t_{j-i-1}$ and $t_j$, then k(i, j)=j, and $t_k(i, j)-t_{j-i-1}$ reduces to $t_j-t_{j-i-1}$. Thus, if $x_j$ was not prefetched at $t_{j-i-1}$ then the loss equals the missed time savings. If the prefetched address at time $t_{j-i-1}$E equals the requested cache miss, i.e., if $b_{j-i}$ precisely equals $x_j$, then $C_i(b_{j-i}, x_j)=0$, as k(i, j)=j−i−1.

$$C_{j-m(j)-1}(b_{m(j)-1}, x_j) = T - \min(T, t_j - t_{k(j-m(j)-1, j)}) \quad \text{Condition 2-b}$$

If $x_j$ was prefetched at time $t_{m(j)}$ by action $b_{m(j)+1}$, $x_j$ would have arrived on time, saving a stall time equal to the memory latency T with respect to no prefetching. If $x_j$ was prefetched at a later time $t_{k(j-m(j)-1, j)}$, the loss is equal to $T-(t_j-t_{k(j-m(j)-1, j)})$. Thus, if $b_{m(j)+1}=x_j$, the associated loss is zero since k(j−m(j)−1, j) equals m(j) and min(T, $t_j-t_{k(j-m(j)-1, j)}$)=T.

$$C_i(b_{j-i}, x_j)=0 \text{ for } i \text{ such that } j-i-1<m(j) \quad \text{Condition 2-c}$$

No prefetching is necessary more than T cycles in advance.

Note that condition set 2 reduces to condition set 1 under the assumption that k(i, j)=j. In that case, Condition 2-a becomes $C_i(b_{j-i},x_j)=t_j-t_{j-i-1}$ for i such that j−i−1>m(j) (and since by definition j−i−1>m(j) this implies $t_j-t_{j-i-1}<T$), and Condition 2-b becomes $C_{j-m(j)-1}(b_{m(j)-1}, x_j)=T-\min(T, t_j-t_j)=T$. If k(i, j) as defined in condition set 2 equals j−i−1, $b_{j-i}$ is the correct action b* for which $C_i(b_{j-i}, x_j)=0$ in Condition 1-a. This explains the derivation of Condition 1-a. While condition set 1 is a particular embodiment of the general approximate loss function, condition set 2 is not. This is because k(i, j) is a function of the actions $b_{j-i}, b_{j-i-1}, \ldots, b_j$, as opposed to the general case, in which sl(j) and $C_i(b, x)$ are required to depend only on the side information.

c. Loss Function Minimization

The goal of the present invention is to optimize system performance by minimizing the approximate loss function. In the prefetching case, the approximate loss function is minimized by manipulating the tree constructed by prefetch engine 330 using address differences $x_j-y_j$ provided by the address difference generator 320 and the rough predictor 350 as explained above. As a reminder, $x_j$ is the cache miss address 310 and $y_j$ is the rough prediction produced by the rough predictor 350. Generally, the tree is traversed, moving forward one branch per index j, and branch weights are updated. Each branch corresponds to an address difference $x_j-y_j$ between the cache miss and the rough prediction. It also represents the action $b_j$ corresponding to address $x_j$ in a one-to-one correspondence between outcomes and actions. In the prefetching application, $b_j$ corresponds to $x_j$ if action $b_j$ is to prefetch $x_j$, but the correspondence can be less trivial in other applications. When sitting at a node, we choose the action whose associated branch emanating from the node has the highest weight. If the current node is a leaf, then some other default action is taken, e.g., make the root the current node and choose one of its branches. For a loss function case without memory, when the outcome $x_j$ is received, we increment the weight of the one action by for which $1(b_j, x_j)$ equals zero by an increment $C_0$. We move along the tree in the direction of the corresponding address difference $x_j-y_j$. Note that for a general loss function $1(b, x)$, the direction of traversal $x_j-y_j$ could differ from the branch that is incremented by the increment $C_0$. For pure prediction, the outcome $x_j$ equals the incremented action $b_j$ (no rough prediction) and the increment $C_0$ equals 1.

For a loss function with memory, optimization is achieved by incrementing the weights of sl(j) branches in the tree, one per each previous prefetch action $b_{j-i}$ to which the received address difference $x_j-y_{j-i}$ contributes a loss. In the prefetching application, for the simplest case, the loss function to be minimized corresponds to condition set 1. To define the branches for which weights need to be incremented, we associate indices to nodes. The current node, i.e., the node at which we are sitting when the prefetch engine 330 receives $x_j$, takes the index j, and indices decrease in the direction of the root. The weights for branches $x_j-y_i$, emanating from the nodes with indices j−i, $0 \leq i < j-m(j)$, are incremented by an increment amount after the occurrence of $x_j$. The simplest form of the increment amount, in correspondence with Condition 1-a, is given by:

$$\min(T, t_j-t_{j-i-1}) \quad \text{Increment Equation 1}$$

Let $N_{j-i}(x_j-y_{j-i})$ denote the weight associated with the branch corresponding to the outcome $x_j$ at the node with index j−i. The branch here corresponds to the difference $x_j-y_{j-i}$ with respect to the rough prediction $y_{j-i}$. The weight $N_{j-i}(x_j-y_{j-i})$ of each node indexed by j−i, $0 \leq i < j-m(j)$, is incremented by Increment Equation 1. No update is done for $-i \leq m(j)$.

Following the update of the weights, the tree is traversed in the direction of the address difference $x_j-y_j$, to reach node j+1, which is used to select action $b_{j+1}$. The action $b_{j+1}$ is derived from an auxiliary ranking of the address differences such that the address ultimately prefetched corresponds to the highest ranked address difference not in the prefetch cache 18 or CPU cache 14. Let $M_{j+1}$ denote the auxiliary ranking of address differences at the new current node j+1 and $M_{j+1}(x-y)$ denote the corresponding ranking of address difference x−y. Let 0 indicate the highest rank, 1 indicate the second highest rank, etc. The weights in the tree yield a natural ranking of the address differences per node. Then action $b_{j+1}$ is determined by adding the address difference corresponding to the outgoing branch from the current node j+1 with the highest rank $M_{j+1}$ to the new rough prediction $y_{j+1}$.

In the data structure, the corresponding rough prediction $y_j$ output from the rough predictor 350 is kept for each node visited in the current path from the root, indexed by j. This is in addition to the keeping the time $t_{j-1}$ at which the node was reached. Notice that node j is reached at time $t_{j-1}$, after occurrence of $x_{j+1}$, and node j remains the current node until the occurrence of $x_j$ at time $t_j$.

Although described for the prefetching application, the above procedure also applies to the general case of minimizing the approximate loss function, with the following differences. The indices j−i satisfy $j-sl(j)<j-i \leq j(j-m$ (j) being the value of sl(j) in the prefetching application). For each index i, the branch whose weight is incremented corresponds to the (unique) action b* for which $C_i(b^*, x_j)=0$. Finally, the increment amount is given by:

General Increment Equation $$C_i(t_0, t_1, \ldots, t_j)$$

Consequently, the sequence of steps that leads to action $b_{j-1}$ at time $t_j$ is the following.

a) While sitting at node j, receive outcome $x_j$.
b) For each node j−i, $0 \leq i < sl(j)$ (sl(j)=j−m(j) for the prefetching case), update the weight of a branch emanating from it.
c) Traverse the tree in the direction $x_j-y_j$, moving from node j to node j+1.
d) Take action $b_{j-1}$ based on the ranking $M_{j-1}$.
e) Wait for outcome $x_{j-1}$ at time $t_{j+1}$.

This implementation of the approximate loss function minimization (for the prefetching application based on Condition Set 1) should become clearer upon reading subsection 3.a, entitled "Tree Data Structure," and was used to generate the results listed in Table 1. The results listed were generated simulating the system 10 (FIG. 1) using a variety of tracing tools commonly known in the art. Only data cache misses were considered. The results obtained are relative to raw, i.e., no prediction, percentages of cycles-per-instruction due to memory stall.

The test system parameters used to generate the results included:

1) scalarity=1.5;
2) bus residency=12 cycles;
3) memory latency=75 cycles;
4) CPU clock cycle=500 MHz;
5) cache 14: 1M:64:2; and
6) prefetch cache 18: 64K:64:16.

TABLE 1

| Trace | Prior Art Prefetch Method (%) | Prefetch Method According To The Present Invention (%) |
|---|---|---|
| Verilog | 33.7 | 41.3 |
| Tpcc5ul | 54.2 | 59.7 |
| Nastran | 8.5 | 14.7 |
| Proe | 29.4 | 29.7 |

Eleven addresses were prefetched for each cache miss generated by the CPU 12, corresponding to the highest ranked addresses not in the prefetch cache 18 or the CPU cache 14. More general strategies are presented next.

In some of the applications envisioned in this invention, it might be possible for the prefetching unit to issue multiple requests for cache lines for each cache miss observed. If the number of requests allowed per miss cycle is r, the prefetching engine can issue a request for the cache lines corresponding to the r branches ranked highest by weight among those emanating from the current node, excluding those already present in the CPU cache or the prefetch cache, or previously requested and on their way to the caches. Alternatively, the list of r selected cache lines could also include high-ranked branches emanating from other nodes in the tree. An example of such a node is one whose path from the root is a suffix of the path of the current node, but which might contain more significant statistical information. The number of requests per miss cycle, r, should be an adaptive system parameter depending on bus traffic, and on the quality of the predictions, as discussed next.

In making decisions about ranking cache lines corresponding to branches emanating from different nodes, or even in the single-request case, it may be useful to assign a reliability measure to the information available at each node. Generally, information derived from a small amount of data is less reliable than information derived from a large amount of data. For example, in the tree data structure, a node j may have been visited just twice, and may have just one descendant node j'. By the nature of the method, if the current node is j, the branch going to j' will be chosen. But this choice is based on very scant information, namely, one previous visit to j. Therefore, the choice of j' for prefetching is of low reliability. In general, the reliability of a branch choice should depend on the weight of the branch and on the number of times the current node has been visited. For example, $R = w - c\sqrt{w(1-w)/n}$ could be used to compute a reliability measure for a branch emanating from the current node, where R is the reliability measure, w is the relative weight of the branch with respect to the total weight of all branches emanating from the current node, n is the number of visits to the current node, and c is a positive scaling constant chosen so that that R increases with w and with n. Other formulas for reliability measures, taking into account other system parameters (e.g., timing information, recency, etc.), or combining weights and counts in different ways, can be similarly derived.

Reliability measures can be taken into account when forming a list of cache lines for a multiple request. For example, a highly reliable second-ranked branch from a node may be preferred over a less reliable first-ranked branch from another node. In the single-request case, the method may choose to ignore the highest-ranked branch from the current node if it has low reliability, and revert to the rough predictor instead, or abstain from making a cache line request altogether.

In general, the reliability measure can be used, together with statistics from bus traffic, to determine the number r of cache line requests at a given cache miss cycle. For example, given a measurement F of the traffic, a reliability threshold $R_0(F)$ can be computed so that only requests of reliability $R > R_0(F)$ are submitted. $R_0(F)$ is an increasing function of F, and the number r of requests would also be bounded by some absolute maximum $r_{max}$, a system parameter. In some cases where F is large, $R_0(F)$ will also be large, and there might not be any candidate addresses that are sufficiently reliable. In those cases, the prefetch engine will abstain from making a cache line request (r=0), as mentioned above.

Returning to the loss function minimization, a more complicated implementation corresponds to minimizing a loss function based on condition set 2. In that case, let the index k'(i, j) represent the smallest node index strictly greater than j−i such that $M_{k'(i,j)}(x_j - y_{k'(i,j)}) = 0$, or k'(i, j)=j+1 if not such node exists. The k'(i, j) would correspond to k(i, j)+1 (since an action $b_j$ selected at node j is taken at time $t_{j-1}$) except for the following two differences. First, cases in which $x_j$ is prefetched without the highest rank are not eligible for the value of the index k'(i, j) because, in a later occurrence of the node, the address with the highest rank might not be in the prefetch cache 18 or CPU cache 14 (note that the node is revisited with other addresses since the tree is created with address differences). Second, k'(i, j) is strictly greater than j−i, rather than greater than or equal to j−i. The increment amount applied to $N_{j-i}(x_j - y_{j-i})$ is then given by:

$$\min(T, t_j - t_{j-i-1}) + t_j + t_{k'(i,j)-1}$$      Increment Equation 2

Increment Equation 2 reduces the increment of Increment Equation 1 by an amount $t_j - t_{k'(i,j)-1}$. This amount represents the savings by prefetching $x_j$ at time as opposed to time $t_j$. Note also that if k'(i, j)=j−1, then Increment Equation 2 reduces to Increment Equation 1 (which represented the increment amount applied to $N_{j-i}(x_j - y_{j-i})$ if $x_j$ were not requested before time $t_j$).

The fact that k(i, j) in condition set 2 is a function of the actions $b_{j-i}, b_{j+i-1}, \ldots, b_j$, and not just side information, causes this more complicated method for minimizing the approximate loss function to suffer from a "positive feedback" effect. This effect is due to the fact that Increment Equation 2 updates the weights using the actions by that were actually taken. Thus, these actions are being reinforced even though they may have been wrong.

One alternative to dealing with positive feedback is to base the update of the tree on the action that would have been adopted with the new data that is now available. To this end, we define the index k'(i, j) based on the counts at the time that the nodes are being updated due to the occurrence of $x_j$. Thus, the index k'(i, j) corresponds to the first node strictly after node j−i at which $x_j$ would have been ranked first based on the counts that are available after $x_j$ is registered. Note that these counts were not available when the actual prefetching decision was made. If no such node exists, then k'(i, j) equals j−1. By using the newly available data, the positive feedback is broken. Another alternative to avoid dependencies on future data is to use the simplification presented earlier where it is assumed that $x_j$ is never requested before time $t_j$. This is the simplified version of the approximate loss function given by condition set 1, discussed earlier.

d. Tree Evolution

The prescribed tree traversal policy, when "sitting" at node j, and after receiving outcome $x_j$, is to take the branch corresponding to the difference $x_j - y_j$, where $y_j$ is the value predicted by the rough predictor. However, such a branch may not exits, e.g., if such difference had never been observed in previous visits to node j. In that case, a new branch and node are created to correspond to the difference $x_j - y_j$. The weight of the new branch is set according to the appropriate increment equation (taking the increment from a base value of zero), and is stored in the new node. Also, since the new node has no successors, it provides no useful information to predict future patterns. Therefore, the current node is not set to the new node. A natural choice is to reset the current node to the root of the tree (as is done with LZ trees in data compression applications). However, this has the disadvantage of losing the context information, i.e., the path that was taken to arrive at the new node. An alternative approach is to take a suffix of that path (i.e., the last few branches), and attempt to traverse the tree from the root following branches corresponding to the sequence of address differences in the suffix, if such sequence of branches from the root exists. The length of the suffix initially attempted can be made a fixed or adaptive system parameter. Thus, the current node for the next new event would be deeper in the tree than the root, and decisions at that point would benefit from more context information. If the path from the root does not exist, then shorter suffixes can be tried. In the worst case, an empty suffix is used, which corresponds to resetting the current node to the root node.

New nodes may also be created in the process of updating the weights of branches emanating from nodes situated from the current node up toward the root of the tree, if a branch whose update is requested did not previously exist.

At system initialization time, the method starts with a minimal tree, e.g., just the root or the root and a small number of nodes. As more data is observed, new nodes are added to the tree over time until they eventually fill the storage space available for the data structure, which must be finite in a practical application. When no more space is available, various courses of action are possible, reflecting a tension between keeping information learned from patterns in past data, and allowing space for new patterns to be learned from future data. Some of these courses of action are described below:

No reset: In this case, the data structure is frozen, and no new nodes are created. This strategy is appropriate when data is stationary, future patterns are likely to be very similar to past ones, and few new patterns are expected. This assumption is not realistic in the practical applications envisioned for the present invention.

Full reset: In this case, the data structure is reset to the same initial state as at system startup time, e.g., a minimal tree consisting solely of the root node, or the root and a few nodes. This strategy "forgets" all the patterns learned from the past, and allows maximum space for new patterns. The strategy incurs a significant penalty in the effectiveness of prefetching decisions for some time after the reset.

The above two strategies are at the extreme ends of a "past emphasis vs. future emphasis" trade-off. More useful intermediate points are given by the following policies:

Leaves reset: In this case, the leaves of the tree are discarded, as these are nodes that have not been reached again after being created, and they are deemed "less useful" in predicting future patterns. Notice that even after the leaves are trimmed, there might still remain nodes in the tree that have not been visited since the last reset. For example, if a long path of branches is never traversed again, it will take several reset cycles for all the nodes in the path to become leaves and be discarded.

"Standby dictionary" reset: This strategy remedies the defect mentioned above for the leaves reset. In this case, all nodes that have not been visited since the last reset are discarded. U.S. Pat. No. 5,243,341 to Seroussi et al., issued Sep. 7, 1993, titled "Lempel-Ziv Compression Scheme with Enhanced Adaptation," teaches this method in the context of data compression.

In methods involving partial tree resets, provisions need to be made to adjust the weights of the branches remaining in the tree after the reset. This is necessary to avoid giving excessive weight to past information relative to the information that will be stored in new nodes after the reset. A simple strategy that achieves this "memory fading" effect is to halve all the weights of surviving branches after the reset, using some rounding convention to preserve integer weights. In the case of a "standby dictionary" reset strategy, the weights accumulated since the last reset could be stored, and used as the operative weights after the next reset (i.e., a "standby weight").

The above-described approximate loss function and its minimization method should be appreciated by those persons skilled in the art as applying to multiple aspects of a computer system in which system optimization is important, including database management systems, multimedia applications, distributed applications, locality management for large scale computers, and hierarchical computer memories. The approximate loss function and its minimization method may additionally apply to memory subsystems, input/output subsystems, system control unit, interconnect, availability, operating system, storage, web server cache prediction, data replication, data locality enhancement, and the like. Application of the minimization method requires that the actions by and the outcomes x; be in the same set, in one-to-one correspondence.

3. Prefetch Apparatus Operation a. Tree Data Structure

As discussed earlier, the prefetch engine 330 uses a data structure to track and weight the address differences generated by the address difference generator 320. The address difference generator 320 determines the difference between the guess of rough predictor 350 and the actual cache miss address 310. One data structure that can be used to track and weight the address differences is a tree.

As a reminder, a tree is a directed graph without circuits. Branches may be traversed in only one direction. A tree has a unique node, denoted as a root, without incoming branches. A path in a tree is a sequence of branch traversals. Except for the root, every node of a rooted tree has exactly one incoming branch, and therefore, there exists a unique path leading to the node from the root. A node without an outgoing branch is called an external node or a leaf. Nodes that are neither leaves nor the root are called internal nodes.

To illustrate the prefetch engine's growth and use of the tree data structure in attempting to minimize the simplest loss function (condition set 1), consider the following example. Assume that the CPU cache 14 can hold a total of 4 cache lines at a time, and that the current lines in the CPU cache, listed in the order in which they will be released, are A, C, E, and G. Using letter names for cache lines helps distinguish them from other numbers used in the example. The cache line names, in alphabetical order from A to P, can be mapped to cache line addresses 0–15, respectively. Further, the example uses arithmetic modulo 16 to calculate address differences: A–P=0–15=–15 (mod 16)=1. The prefetch cache 18 holds 2 lines of memory at a time, and the current lines in the prefetch cache, listed in the order in which they will be released, are B and F. Ideal conditions are assumed: i.e., only the CPU and the prefetch engine place demands on the system. Time is measured in clock cycles and denoted by t. Assume that each instruction requires 1 clock cycle to execute, and that the time required to load a line of memory from the main memory is 2 clock cycles (T=2). Each CPU instruction will require one cache line, in the order A, B, C, B, D, E, F, E, P, N, L, J, H, F, D, B, P, N, L, and J. The prefetch engine will only request 1 cache line at a time. Ties in the prefetch engine will be resolved by selecting the branch with the smallest address difference. Finally, the rough predictor used predicts the next cache line after the cache line that caused a cache miss. That is, if cache line E causes a cache miss, the rough predictor will predict cache line F.

The reader should understand that, in general, cache lines include multiple memory addresses. For example, in a 32-bit architecture with 64 memory addresses per cache line, $\log_2 64=6$ bits needed to distinguish the memory addresses within a specific cache line. This leaves 32–6=26 bits to represent the different cache lines. As a reminder, the outcome x and the action b described earlier are cache lines, not individual memory addresses. Thus, only the 26 bits that identify a specific cache line are significant in the decision-making process, including the decision of whether a merger has occurred.

This does not mean, however, that the 6 bits that identify a unique memory address within a cache line are discarded by the predictor. The 6 bits of a specific memory address reference can be useful in deciding, for example, whether to prefetch a cache line or the one following it. If the memory address is low (indicating it is early in the cache line), the predictor may conclude that the next cache line should be prefetched. On the other hand, if the memory address is high (indicating it is late in the cache line), the predictor may prefetch the cache line coming after the next one. In the present example, however, only cache lines are considered.

The reader should also understand that the assumptions provided above are artificial and are used only to simplify the example. For example, in practice, latency actually encompasses two different delay concepts, that associated with the bus (bus residency) and that associated with main memory. Main memory's delay is much longer than the bus's delay. It is the short bus delay that allows the prefetch engine to prefetch multiple cache lines simultaneously. For simplicity, the example assumes the bus residency to be zero.

Figure 5:
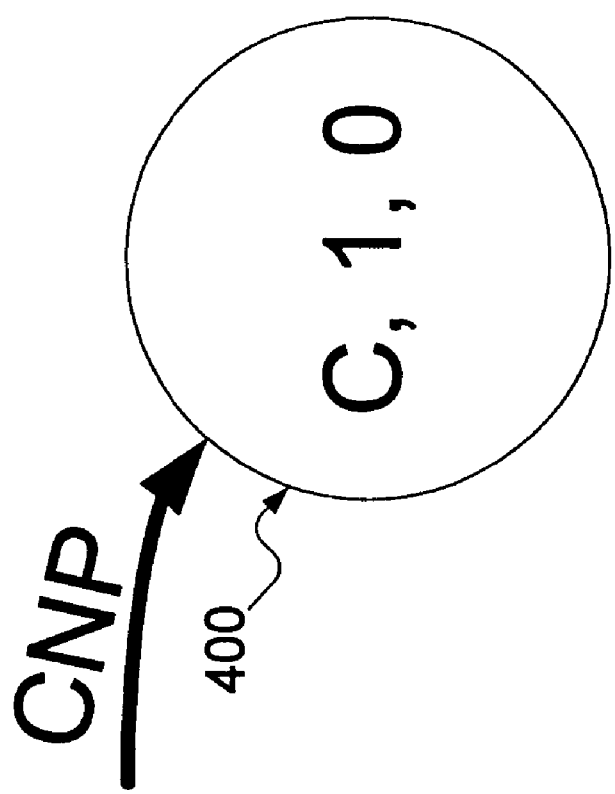
FIGS. 5–19 illustrate the growth and use of a tree in the prefetch engine.
Figure 6:
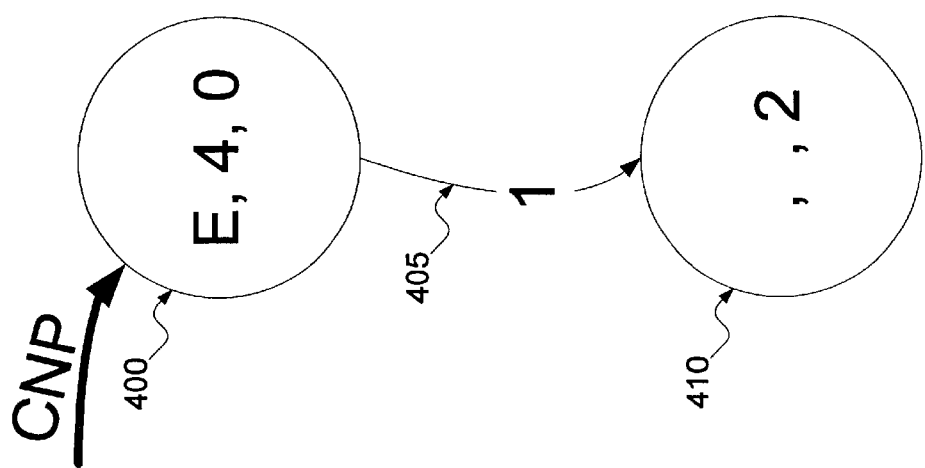

As a final point of explanation, in FIGS. 5–19, the numbers along the branches represent address differences. CNP represents the current node pointer, which points to the current node being examined in the tree. The triplet inside a node indexed by j, represents, respectively, the last rough prediction $y_j$ made when that node was the current node (including now, if the node is the current node), the time $t_{j-1}$ (i.e., excluding CPU stalls) when prefetching actions were taken based on the weights of branches emanating from that node, and the weight of the branch leading to that node. Note specifically that the root node's weight is irrelevant, since it has no incoming branch; in FIGS. 5–19 the root node's weight is arbitrarily set to 0. Notice that $t_{j-1}$ is also the time at which the $(j-1)^{th}$ cache miss $x_{j-1}$ occurs. Nodes in the tree will be represented by the chain of branches from the root node to the desired node, quoted. Thus, the only branch in FIG. 6 is the branch 1 405, whereas the node it points to is the node "1" 410. Looking ahead to the tree of FIG. 9, the newly created node in that Figure is the node "0-9" 430, found by following branch 0 415 from the root node 400, and then following branch 9 425 from node "0" 420. Finally, to make this example easier to follow, only figure reference numbers found in FIGS. 5–19 will be mentioned here. References to the block and flow diagrams of FIGS. 1–4 (e.g., the CPU 12) will not include figure reference numbers.

Table 2 summarizes the cache misses that occur in this example. Table 2 shows the cache line demand that caused the cache miss $x_j$, the time $t_j$ the demand that caused the cache miss occurred, the corresponding time $t'_j$ including stalls, and the line prefetched as a result, which corresponds to action $b_{j+1}$. It also shows the node j+1, which, in principle, is used to rank the possible actions $b_{j+1}$. The node is marked with an asterisk (*) in case the root node is used instead, due to the absence of history at that node.

TABLE 2

| j | Cache Miss $x_j$ | Node j + 1 | $t_j$ | $t'_j$ | Line prefetched |
|---|---|---|---|---|---|
| 0 | B | Root | 1 | 1 | "C" |
| 1 | D | Root | 4 | 4 | E |
| 2 | E | Root | 5 | 7 | G |
| 3 | F | "0"* | 6 | 8 | H |
| 4 | P | Root | 8 | 10 | A |
| 5 | N | Root | 9 | 13 | O |
| 6 | L | "13"* | 10 | 16 | M |
| 7 | J | Root | 11 | 19 | K |
| 8 | H | "13" | 12 | 22 | F |
| 9 | F | "13--13"* | 13 | 25 | B |
| 10 | D | Root | 14 | 26 | P |
| 11 | B | "13" | 15 | 29 | N |

TABLE 2-continued

| j | Cache Miss $x_j$ | Node j + 1 | $t_j$ | $t'_j$ | Line prefetched |
|---|---|---|---|---|---|
| 12 | P | "13--13" | 16 | 30 | A |
| 13 | N | "13--13--13"* | 17 | 31 | J |
| 14 | L | Root | 18 | 32 | H |
| 15 | J | "13--13--13" | 19 | 35 | ... |

As will be seen at time t=1, although the prefetch engine predicts cache line C, cache line C is already loaded in the CPU cache and does not need to be prefetched.

At time t=0, the current node (pointed to by the current node pointer CNP, initialized to the root node 400) is assigned node number j=0. The CPU demands cache line A. As this line is already present in the CPU cache, there is no cache miss. The lines in the CPU cache are re-ordered to be released as C, E, G, A. This re-ordering of the lines in the cache reflects the implementation choice of releasing the least recently used cache line when a cache miss occurs.

At time t=1, the CPU demands cache line B. As this line does not exist in the CPU cache, a cache miss occurs. As this is the first cache miss $x_0$, no rough prediction had been made at time t=0, and the current node (pointed to by the current node pointer CNP) remains the root node 400, which is assigned node number j=1. Finally, $t_0=t'_0=1$. Since cache line B is already present in the prefetch cache, no demand from main memory is needed. The rough predictor predicts line C will cause the next cache miss, being the cache line following the previous miss B. Since the tree at this point consists simply of the root node 400 with no branches out of it, the rough predictor's guess is used without modification. Since line C is already present in the CPU cache, it is moved to the top of the cache, and then line B is brought in from the prefetch cache, producing the line order G, A, C, B (line E was dropped when line B was brought in). Moving line C to the top of the cache before bringing in line B reflects the current implementation; there is no requirement that the operations be performed in this order. As there is no information on which to base another prediction, no further attempts to prefetch cache lines are made at this time. The triplet at the root node 400 (the current node) is updated to reflect that cache line C was rough predicted at the time $t_0=1$, or C, 1, 0, as seen in FIG. 5.

At time t=2, the CPU demands cache line C. This line is already in the CPU cache, so no cache miss occurs. The cache lines of the CPU cache are re-ordered to G, A, B, C.

At time t=3, the CPU demands cache line B. This line is already in the CPU cache, so no cache miss occurs. The cache lines of the CPU cache are re-ordered to G, A, C, B.

At time t=4, the CPU demands cache line D. This line is not found in the CPU cache, so the second cache miss, $x_1$, occurs at time $t_1=t'_1=4$. Since cache line D is not in the prefetch cache either, it must be loaded from main memory. A request for cache line D is placed on the bus, and the CPU stalls until cache line D is loaded into the CPU at time t=4+T=6. Meanwhile, the tree can be updated and the prefetch engine can demand another prefetch. Since the rough predictor at the current node of FIG. 5 predicted line C and line D was the next cache miss, the address difference is D−C=3−2=1. So, the tree is updated by adding branch 1 405 and node "1" 410 to the root node 400. The weight on branch 1 405 is determined by Increment Equation 1 as min(T, $t_1-t_0$)=min(2, 4−1)=min(2, 3)=2. At this point, the current node pointer is updated; however, the node it is updated to point to (node "1" 410) is a newly created node, so the current node pointer is reset to the root node 400, which is assigned node number j=2.

Next, the prefetch engine requests a cache line. Since the last cache miss was line D, the rough predictor predicts line E. Since the current node pointer is the root node 400, the prefetch engine will make its prediction according to the branches out of the root node 400. Since there is only one branch coming out of the root node (branch 1 405), the prefetch engine predicts that an address difference of 1 will occur, and the line that will actually be needed is E+1=F. However, the prefetch cache already holds cache line F, so this line does not need to be loaded. As there are no other branches coming out from the root node, the prefetch engine can make no secondary prediction, so instead it just follows the rough predictor and requests line E. Since the bus residency was assumed to be 0, this request can be placed in the bus immediately (even though a request for line D is in process). Thus, cache line E will also arrive from the main memory at time t=4+T=6. The triplet at the root node 400 (the current node) is updated to reflect that line E was rough predicted at time $t_1=t'_1=4$, or E, 4, 0. At this point, the tree looks as in FIG. 6.

At time t=6, cache line D arrives from the main memory. At this point it is loaded into the CPU cache, which is re-ordered to A, C, B, D, and the CPU can now proceed. Since an initial assumption was that the CPU would need 1 instruction cycle between the memory demands of the example, the next memory demand by the CPU will occur at t=6+1=7. At the same time, cache line E arrives from the main memory. It is loaded into the prefetch cache whose lines are re-ordered to F, E.

At time t=7, the CPU demands cache line E. Since this line is not to be found in the CPU cache, the third cache miss, $x_2$, occurs at time $t'_2=7$. Since the CPU stalled for 2 cycles while waiting for cache line D to arrive from main memory, this corresponds to $t_2=5$. Since cache line E is already present in the prefetch cache, no demand from main memory is needed. It is loaded into the CPU cache whose lines are re-ordered to C, B, D, E, and the prefetch cache is re-ordered to E, F. The tree is now updated to reflect the new cache miss.

Since the rough prediction at the current node of FIG. 6 (the root node 400) was E and cache line E was the next cache miss, the address difference is E−E=0. Branch 0 415 and node "0" 420 are created from the root node 400. The weight on branch 0 415 is determined by Increment Equation 1 as $\min(T, t_2-t_1)=\min(2, 5-4)=\min(2, 1)=1$. At this point, the current node pointer is updated; however, the node it is updated to point to (node "0" 420) is a newly created node, so the current node pointer is reset to the root node 400, which is assigned node number j=3.

Next, the prefetch engine requests a cache line. Since the last cache miss was line E, the rough predictor predicts line F. Since the current node pointer is the root node 400, the prefetch engine will make its prediction according to the branches out of the root node 400. Since branch 0 415 has a weight of 1 and branch 1 405 has a weight of 2, the prefetch engine predicts an address difference of 1 (the address difference branch with the largest weight). So, the prefetch engine predicts cache line F+1=G, and requests it be loaded from main memory. Cache line G will arrive from the main memory at time t=7+T=9. The triplet at the root node 400 (the current node) is updated to reflect that line F was rough predicted at time $t_2=5$, or F, 5, 0. At this point, the tree looks as in FIG. 7.

At time t=8, the CPU demands cache line F. Since this line is not to be found in the CPU cache, a fourth cache miss, $x_3$, occurs at time $t'_3=8$, $t_3=6$. Since cache line F is already in the prefetch cache it can be immediately transferred to the CPU cache, which is re-ordered to B, D, E, F, and the prefetch cache is re-ordered to F, E. The tree is now updated to reflect the new cache miss.

Figure 7:
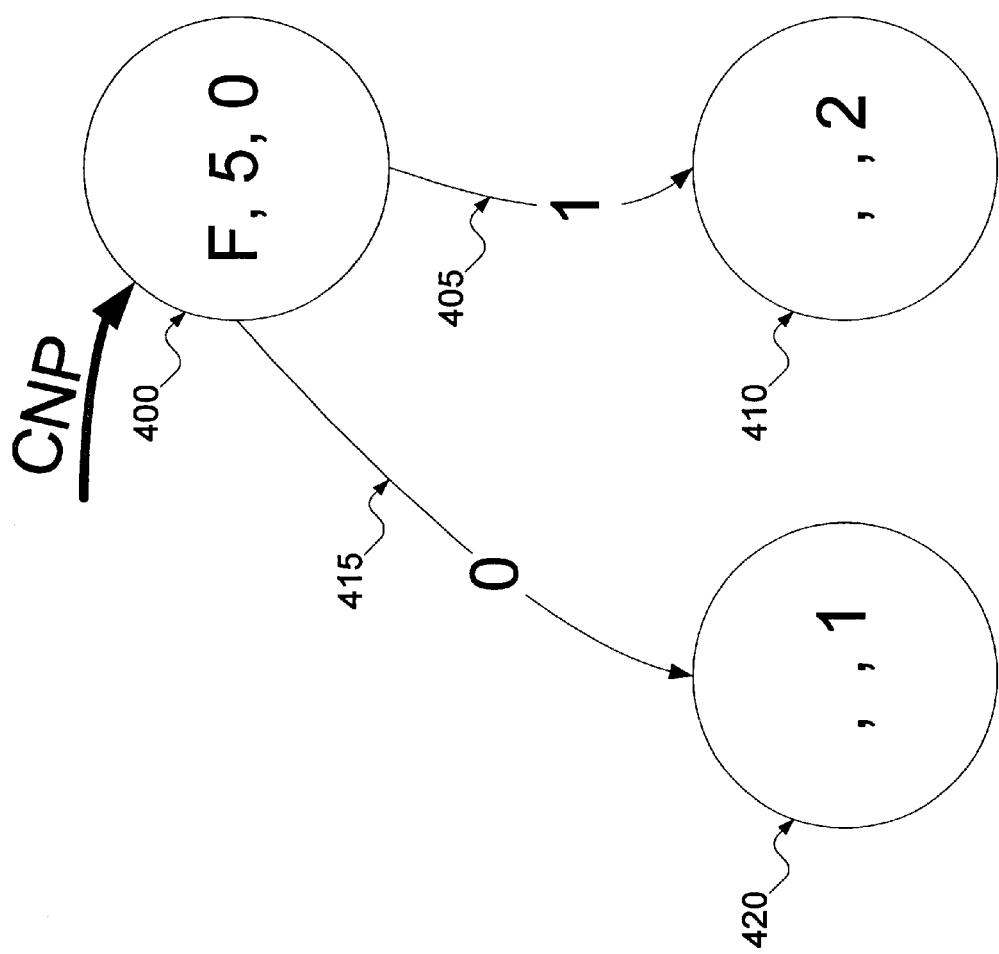

Since the rough predictor at the current node of FIG. 7 (the root node 400) predicted line F and line F was the next cache miss, the address difference is F−F=0. So, branch 0 415 of the tree is updated by incrementing its weight by $\min(T, t_3-t_2)=\min(2, 6-5))=\min(2, 1)=1$, according to Increment Equation 1, to obtain a total weight of 2. Since there is a branch corresponding to the current address difference (branch 0 415; this is the first time a branch already exists), the current node pointer is updated by moving along branch 0 415. Thus, the current node pointer points to the node "0" 420, which is assigned node number j=4.

Next, the prefetch engine requests a cache line. Since the last cache miss was line F, the rough predictor predicts line G. The current node pointer points to node "0" 420 which has no outgoing branches; to make its prediction, the prefetch engine uses the root node 400 as a model. The root node 400 has two outgoing branches 0 415 and 1 405, both with weights of 2. Since there is a tie, the lowest branch (branch 0 415) would ordinarily be used, and the prefetch engine would predict G+0=G. However, the prefetch engine initiated a request for cache line G at time t=7; it will arrive at time t=9. So instead branch 1 405 is used, and the prefetch engine requests line G+1=H be loaded. The request for cache line H will be satisfied at time t=8+T=10. The triplet at node "0" 420 (the current node) is updated to G, 6, 2. At this point, the tree looks as in FIG. 8.

At time t=9, the CPU demands cache line E. Since this line is already in the CPU cache, no cache miss occurs. The CPU cache is re-ordered to B, D, F, E. At the same time, the prefetch engine's request for cache line G is satisfied and loaded into the prefetch cache, which is re-ordered to E, G.

At time t=10, the CPU demands cache line P. Since this line is not to be found in the CPU cache, a cache miss, $X_4$, occurs at time $t'_4=10$, $t_4=8$. Since cache line P is not in the prefetch cache either, it must be loaded from main memory. A memory load request is placed on the bus, and the CPU stalls until cache line P is loaded into the CPU at time t=10+T=12. Cache line H arrives from the main memory and is loaded into the prefetch cache, whose lines are re-ordered to G, H. Meanwhile, the tree can be updated and the prefetch engine can demand another prefetch.

Figure 8:
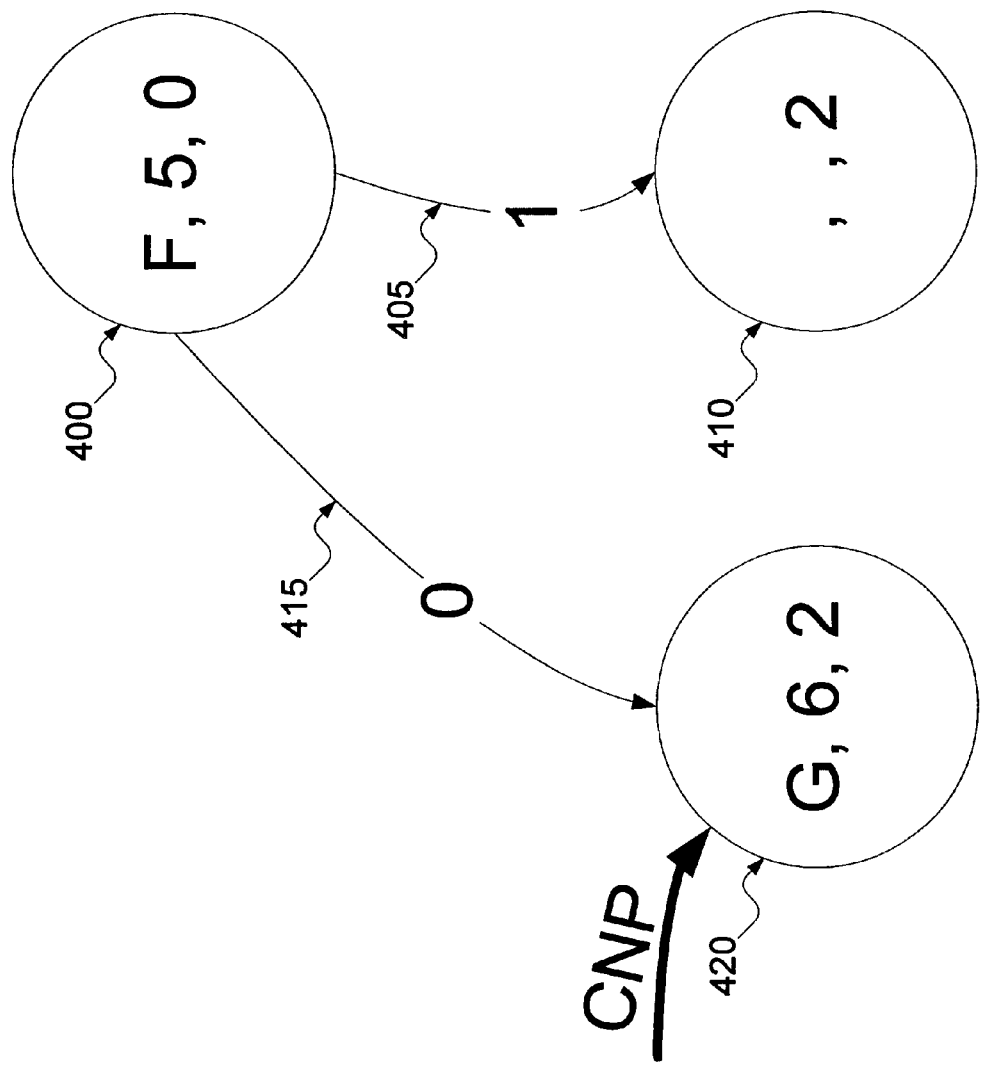
Figure 9:
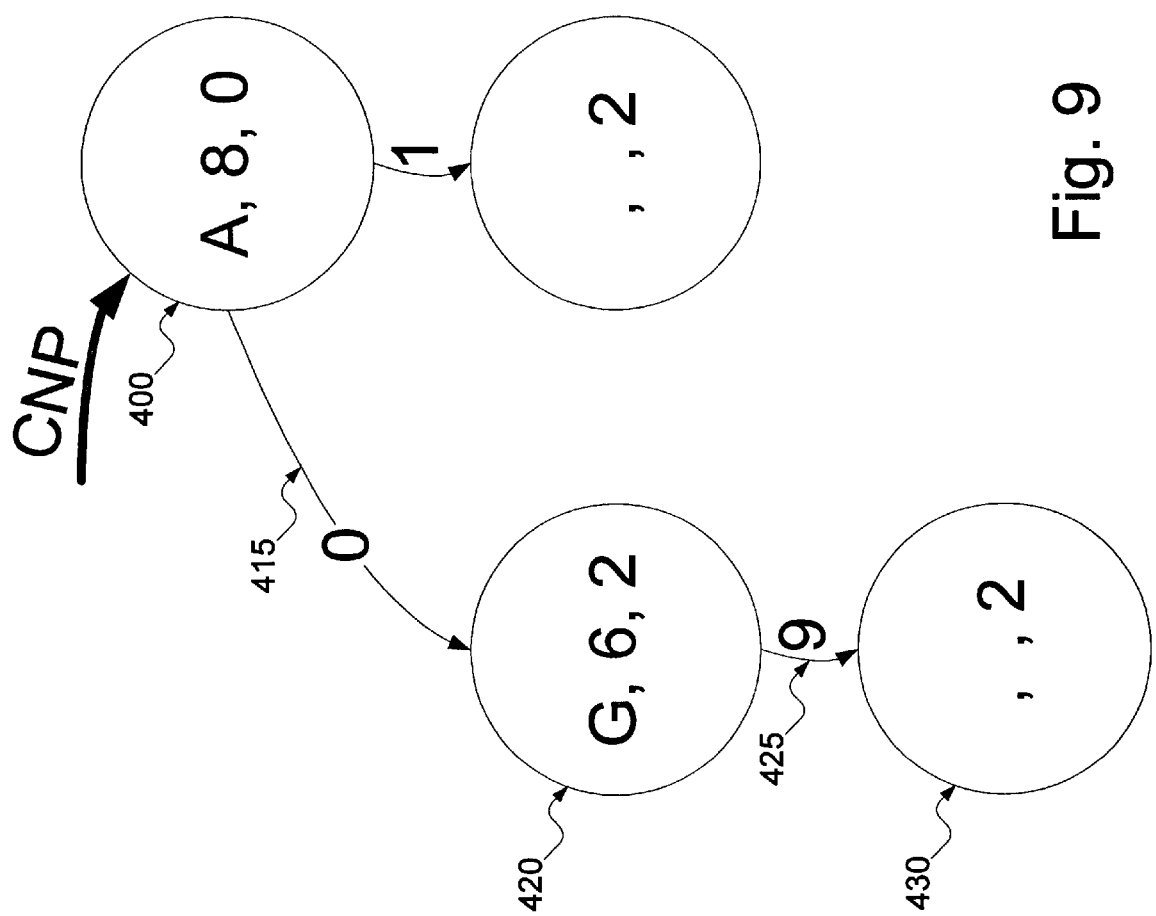
Figure 10:
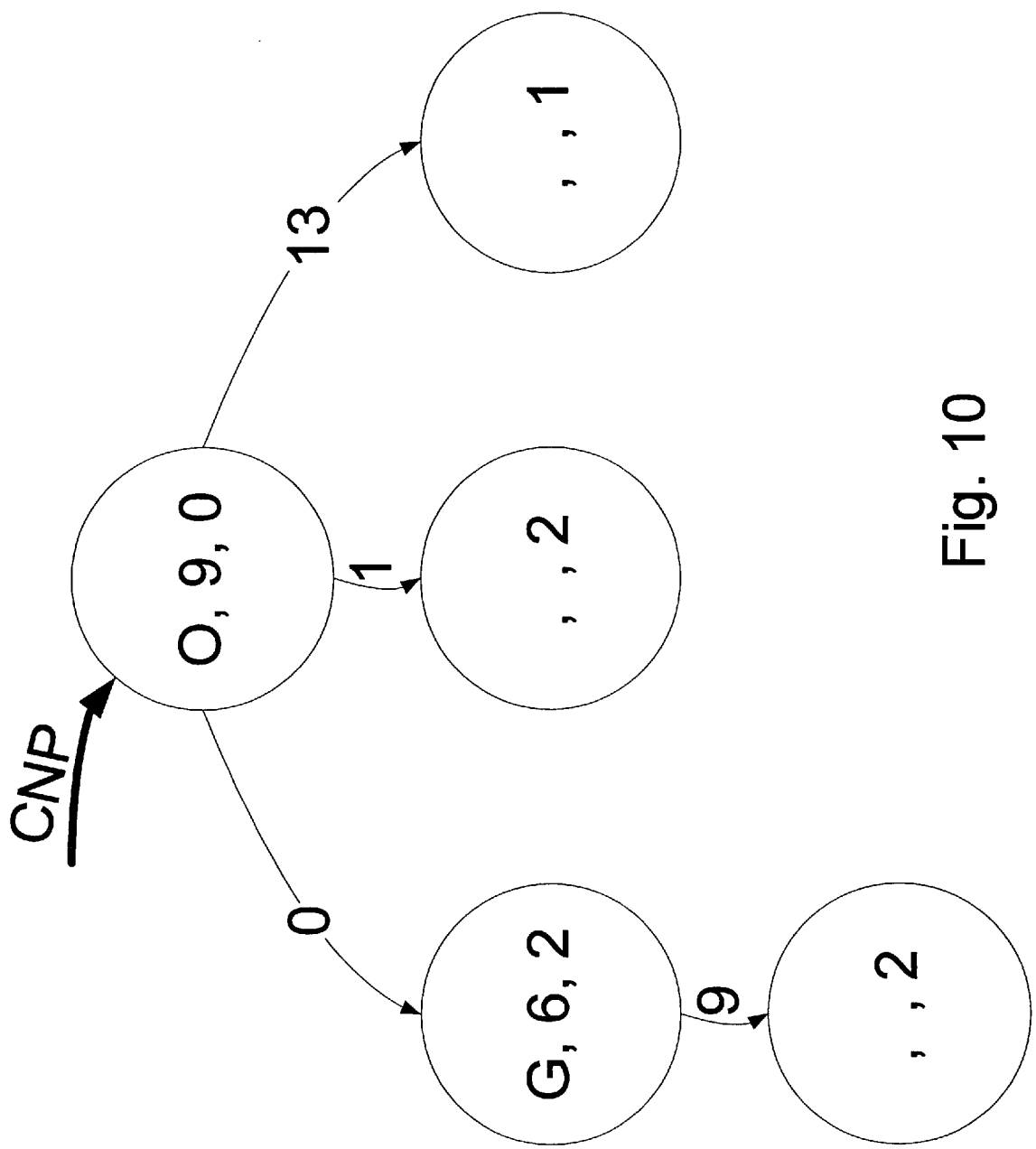
Figure 11:
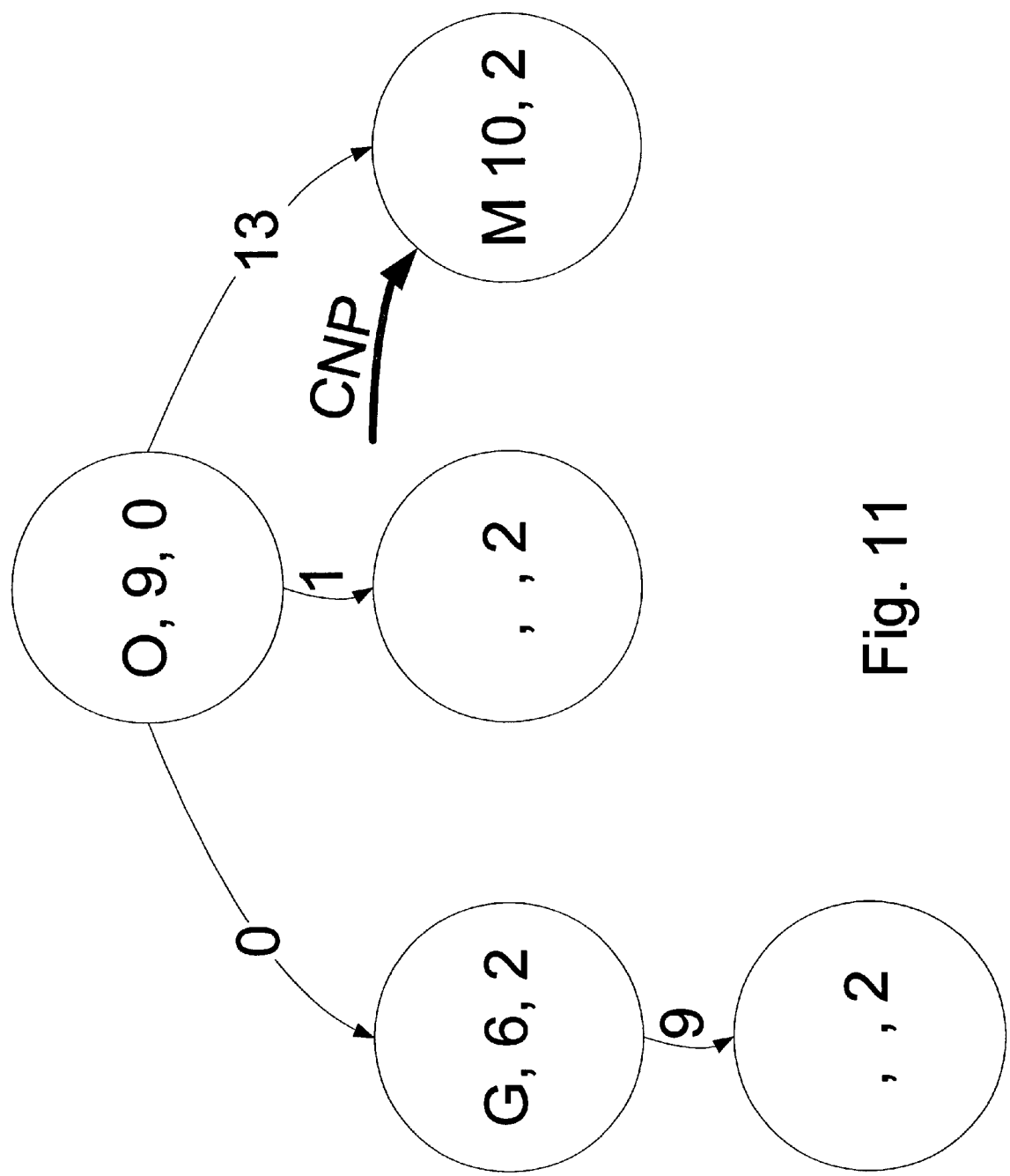
Figure 12:
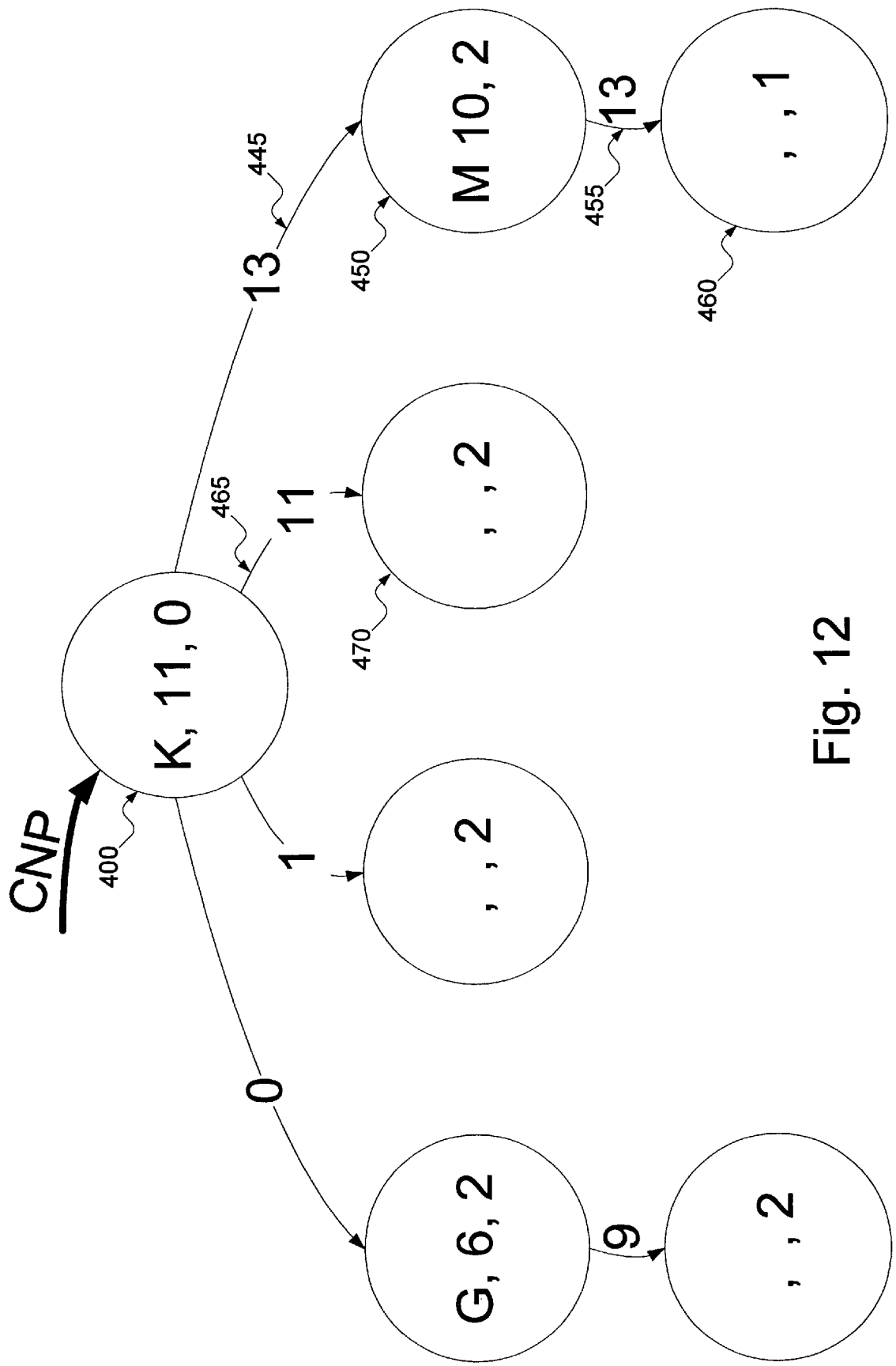
Figure 13:
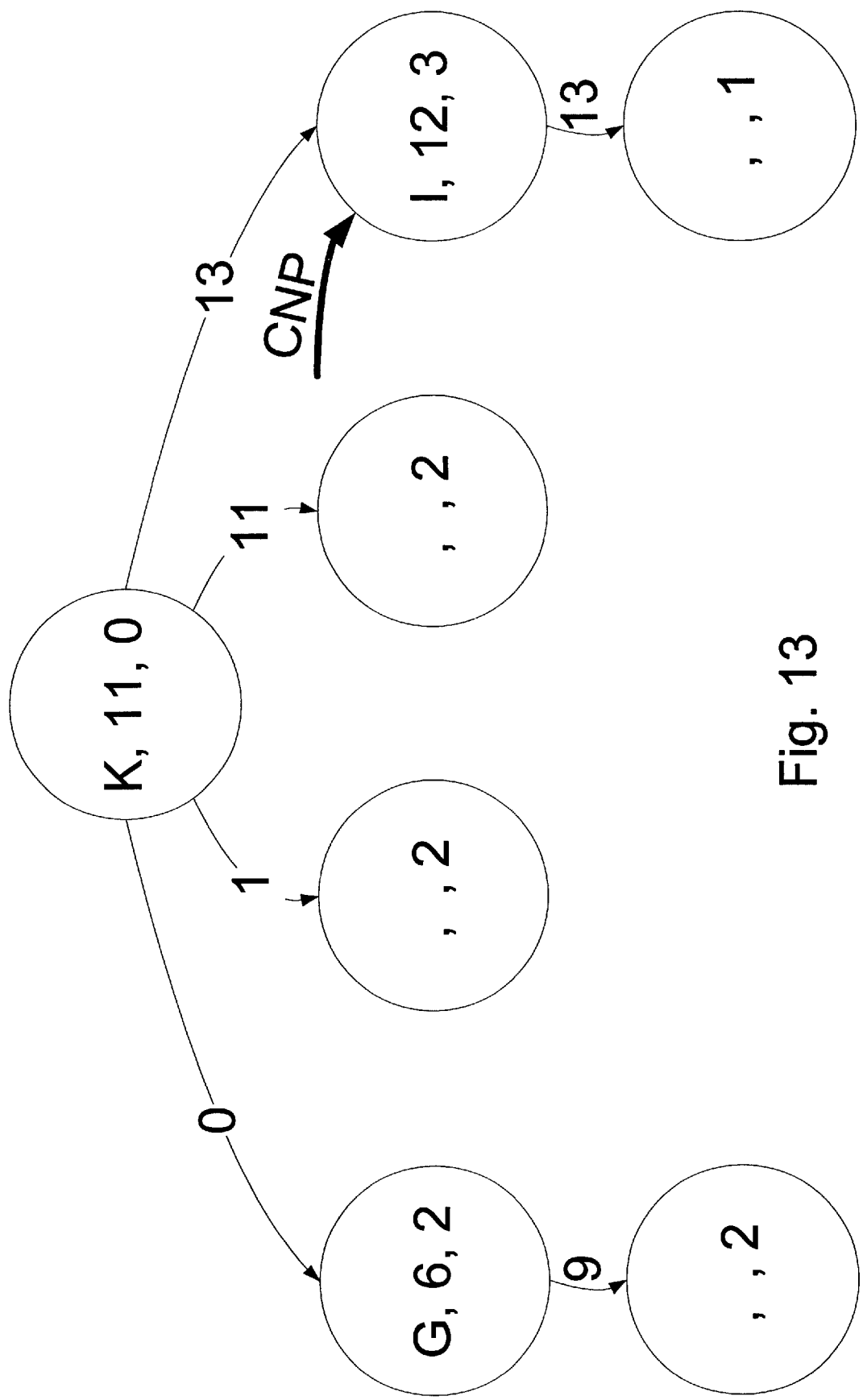
Figure 14:
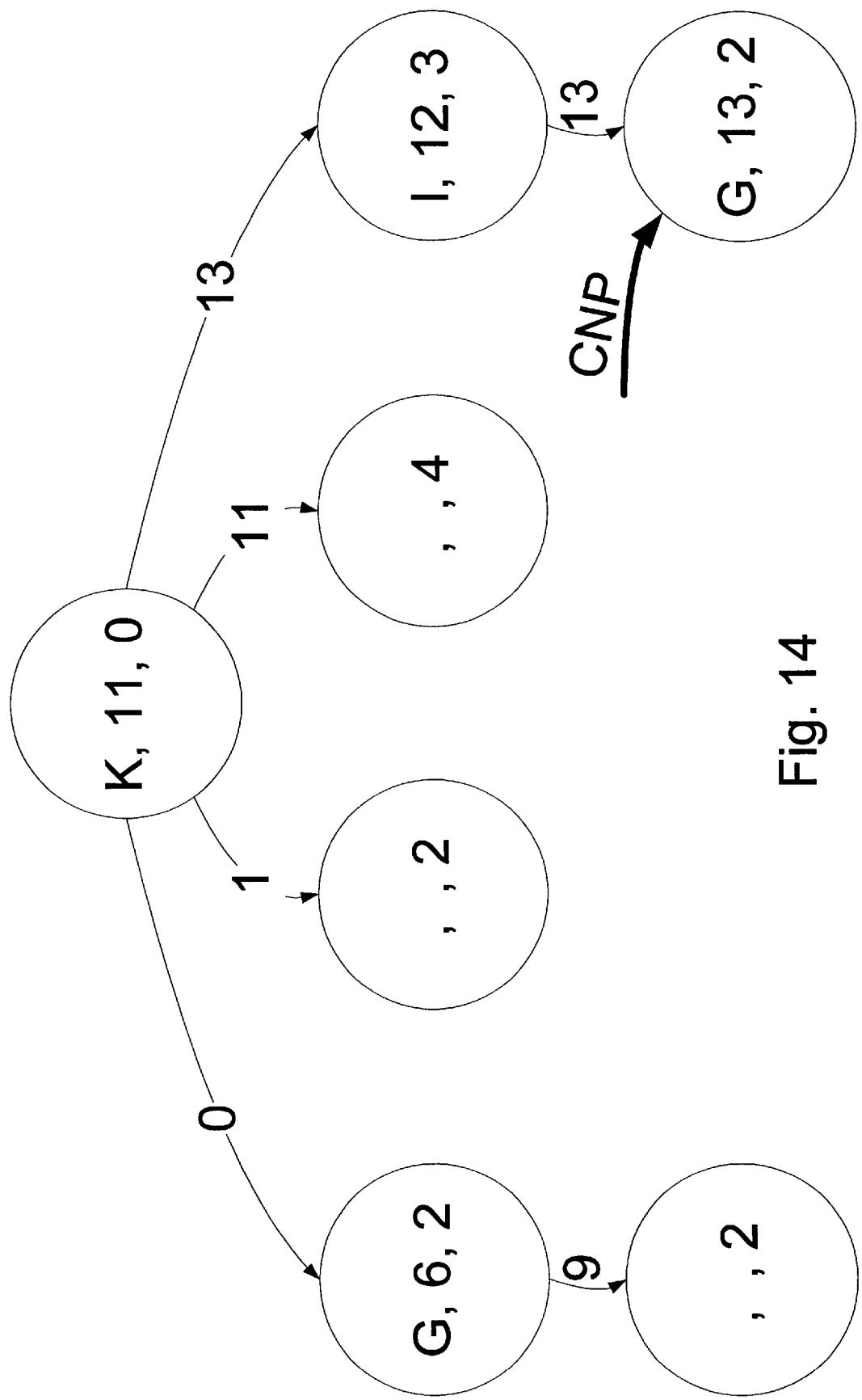
Figure 15:
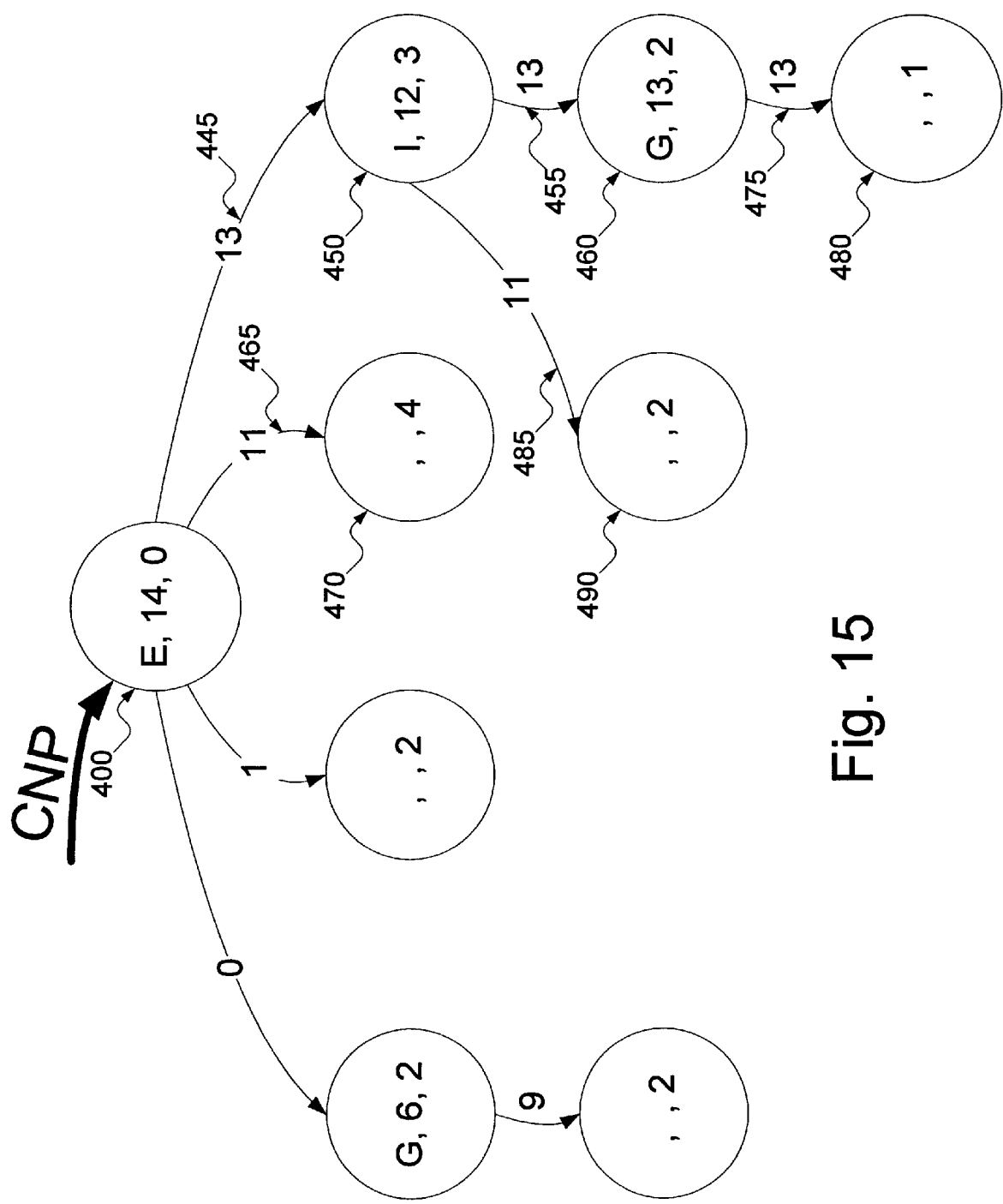
Figure 16:
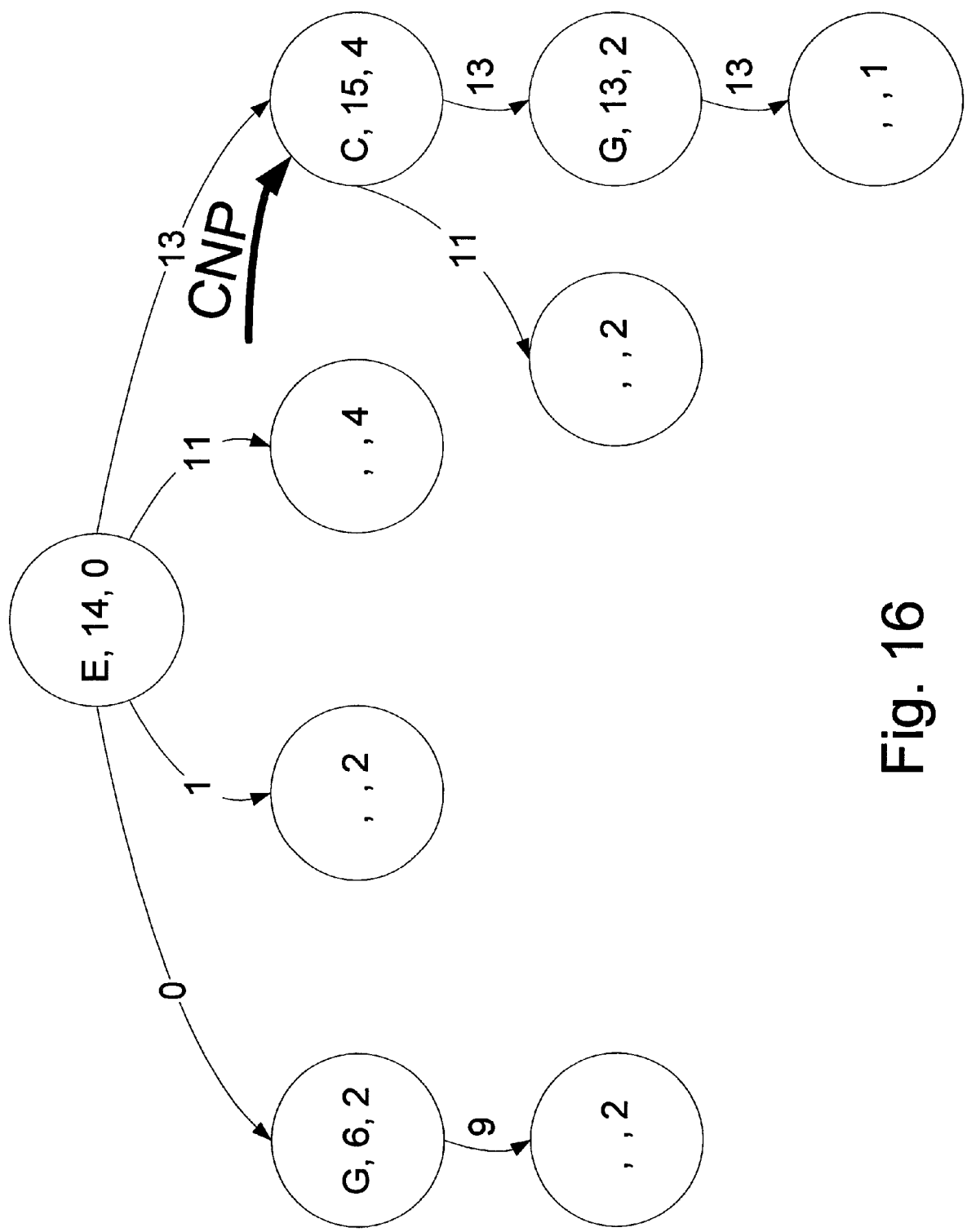
Figure 17:
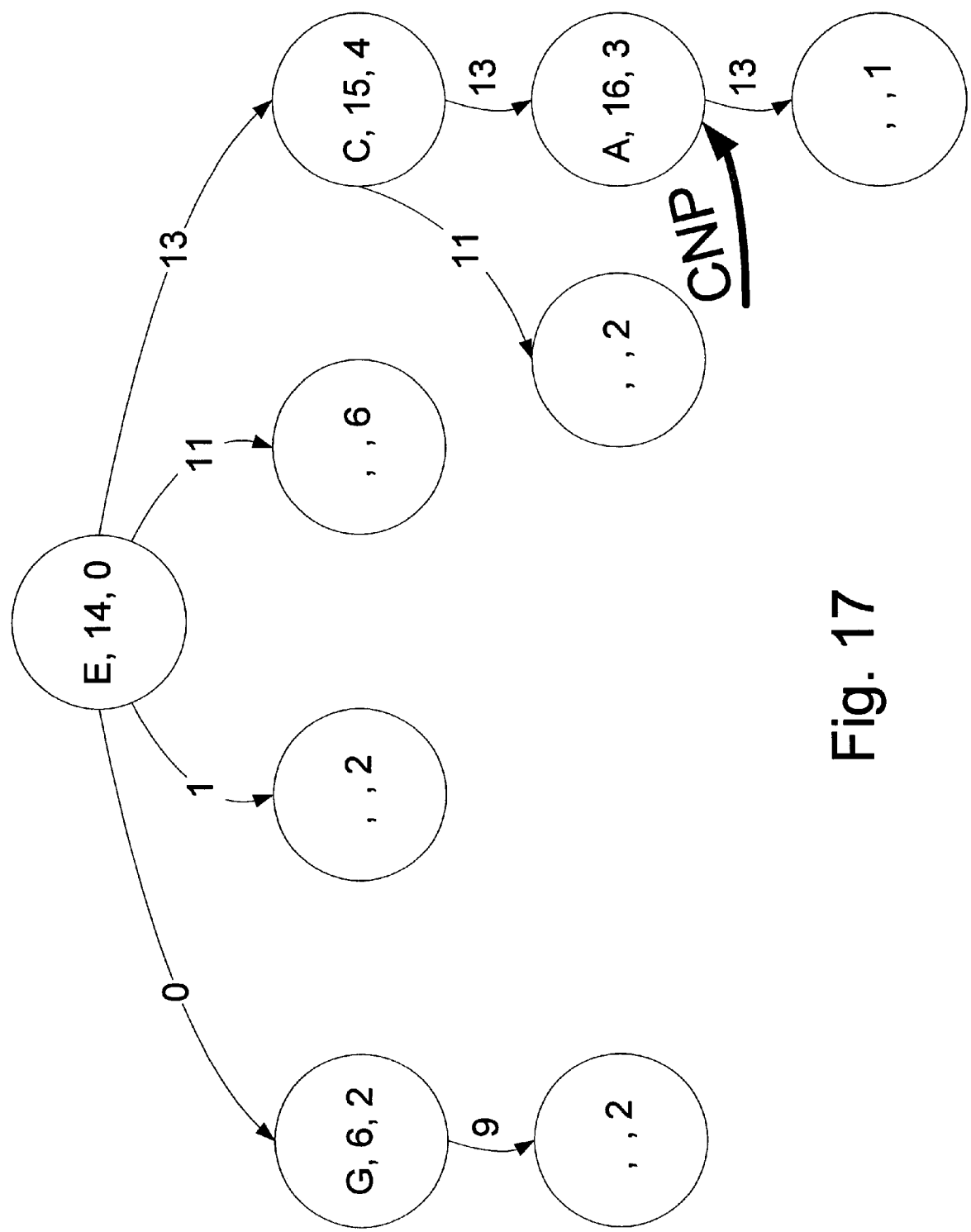
Figure 18:
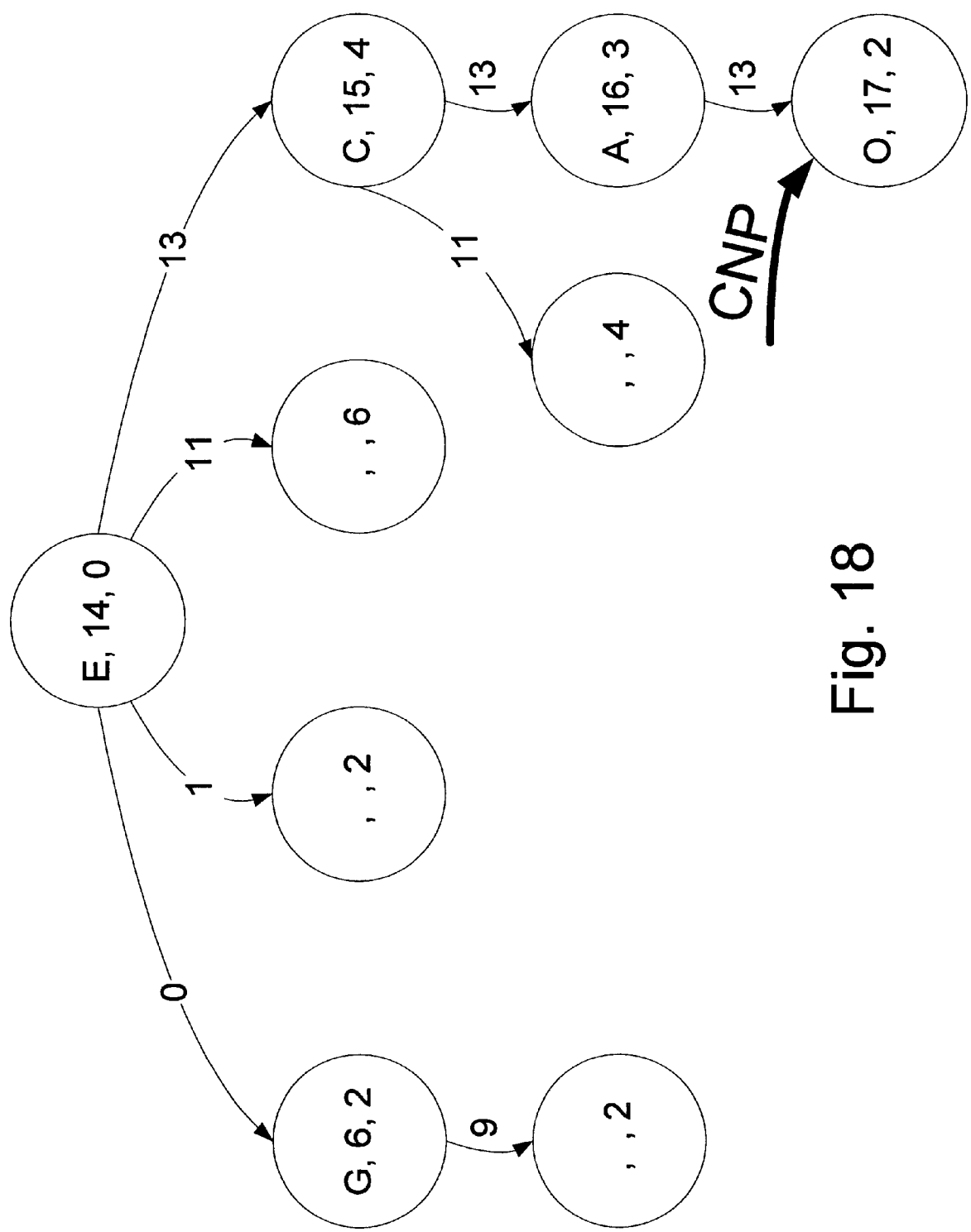
Figure 19:
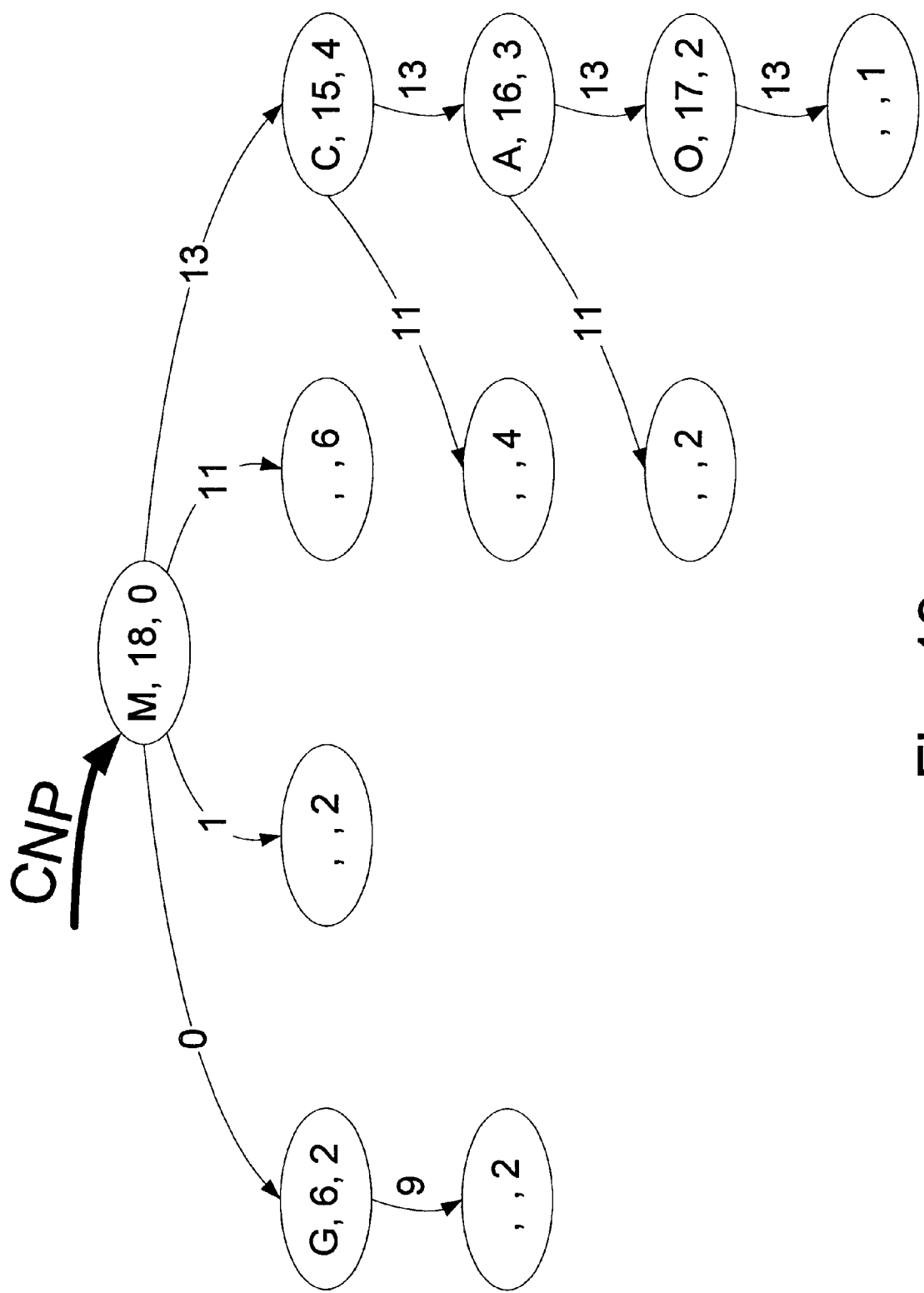

Since the rough prediction at the current node of FIG. 8 (node "0" 420) was G and cache line P was the next cache miss, the address difference is P−G=15−6=9. Branch 9 425 and node "0-9" 430 are created from the node "0" 420. Branch 9 425 is assigned a weight of $\min(T, t_4-t_3)=\min(2, 8-6)=\min(2, 2)=2$. Further, since the current node is not the root node 400, Increment Equation 1 specifies that weights for branches emanating from nodes with numbers j, j−1, . . . , m(j)+1, need to be updated. Here, j=4 and m(j)=3, since that is the largest index l for which $t_4-t_l \geq T$. Thus, only branch 9 425, emanating from node "0" 420, which is indexed j=4, is updated. At this point, the current node pointer is updated; however, the node it is updated to point to (node "0-9" 430) is a newly created node, so the current node pointer is reset to the root node 400, which is assigned node number j=5.

Next, the prefetch engine requests a cache line. Since the last cache miss was line P, the rough predictor predicts line A (recall that modulo arithmetic is used). Since the current node pointer is the root node 400, the prefetch engine will make its prediction according to the branches out of the root node 400. Since branches 0 415 and 1 405 each have a weight of 2, the tie break rule is used, and an address difference of 0 is used. A+0=A, so the prefetch engine requests that cache line A be prefetched. Cache line A will arrive from the main memory at time t=10+T=12. The triplet at the root node 400 (the current node) is updated to A, 8, 0. At this point, the tree looks as in FIG. 9. (From this point until the end of the example, figure reference numbers will be used only where helpful.)

At time t=12, cache line P arrives from the main memory. It is loaded into the CPU cache, whose lines are re-ordered to D, F, E, P, and the CPU is allowed to proceed. Cache line A also arrives from the main memory at this time. It is loaded into the prefetch cache, whose lines are re-ordered H, A.

At time t=13, the CPU demands cache line N. This line is not found in the CPU cache, so cache miss $x_5$ occurs at time $t'_5=13$, $t_5=9$. Since cache line N is not in the prefetch cache either, it must be loaded from main memory. A memory load request is placed on the bus, and the CPU stalls until cache line N is loaded into the CPU at time t=13+T=15. Meanwhile, the tree can be updated and the prefetch engine can demand another cache line.

Since the rough prediction at the current node pointer was A and cache line N was the next cache miss, the address difference is N−A=13−0=13. Branch 13 and node "13" are created from the root node. Branch 13 is assigned a weight of $\min(T, t_5-t_4)=\min(2, 9-8)=\min(2, 1)=1$. At this point, the current node pointer is updated; however, the node it is updated to point to (node "13") is a newly created node, so the current node pointer is reset to the root node, which is assigned number j=6.

Next, the prefetch engine requests a cache line. Since the last cache miss was line N, the rough predictor predicts line O. Since the current node pointer is the root node, the prefetch engine will make its prediction according to the branches out of the root node. Since branches 0 and 1 each have a weight of 2 and branch 13 has a weight of 1, the tie break rule is used, and an address difference of 0 is used. O+0=O, so the prefetch engine requests that cache line O be prefetched. Cache line O will arrive from the main memory at time t=13+T=15. The root node's triplet (the current node) is updated to O, 9, 0. At this point, the tree looks as in FIG. 10.

At time t=15, cache line N arrives from the main memory. It is loaded into the CPU cache, whose lines are re-ordered to F, E, P, N, and the CPU is allowed to proceed. Cache line O also arrives from the main memory at this time. It is loaded into the prefetch cache, whose lines are re-ordered A, O.

At time t=16, the CPU demands cache line L. This line is not found in the CPU cache, so cache miss $x_6$ occurs at time $t'_6=16$, $t_6=10$. Since cache line L is not in the prefetch cache either, it must be loaded from main memory. A memory load request is placed on the bus, and the CPU stalls until cache line L is loaded into the CPU. Meanwhile, the tree can be updated and the prefetch engine can demand another cache line. Since the rough prediction at the current node pointer was O and cache line L was the next cache miss, the address difference is L−O=11−14=−3 (mod 16)=13. Branch 13's weight is incremented by $\min(T, t_6-t_5)=\min(2, 10-9)=\min(2, 1)=1$, for a total weight of 2. Since node "13" exists, the current node pointer is set to point to node "13," which is assigned number j=7.

Next, the prefetch engine requests a cache line. Since the last cache miss was line L, the rough predictor predicts line M. Since the current node pointer points to a node with no outgoing branches, the prefetch engine will make its prediction according to the branches out of the root node. Since branches 0, 1, and 13 each have a weight of 2, the tie break rule is used, and an address difference of 0 is used. M+0=M, so the prefetch engine requests that cache line M be prefetched. Cache line M will arrive from the main memory at time t=16+T=18. Node "13"'s triplet (the current node) is updated to M, 10, 2. At this point, the tree looks as in FIG. 11.

At time t=18, cache line L arrives from the main memory. It is loaded into the CPU cache, whose lines are re-ordered to E, P, N, L, and the CPU is allowed to proceed. At the same time, cache line M arrives from the main memory. It is loaded into the prefetch cache, whose lines are re-ordered O, M.

At time t=19, the CPU demands cache line J. Since this line is not found in the CPU cache, cache miss $x_7$ occurs at time $t'_7=19$, $t_7=11$. Since cache line J is not in the prefetch cache either, it must be loaded from main memory. A memory load request is placed on the bus, and the CPU stalls until cache line J is loaded into the CPU. Meanwhile, the tree can be updated and the prefetch engine can demand another cache line. Since the rough prediction at the current node pointer (node "13" 450) was M and cache line J was the most recent cache miss, the address difference is J−M=9−12=−3 (mod 16)=13. Since there is no outgoing branch 13 from node "13" 450, branch 13 455 and node "13-13" 460 are created. Branch 13 455 is given a weight of $\min(T, t_7-t_6)=\min(2, 11-10)=\min(2, 1)=1$. Further, since the current node is not the root node 400, Increment Equation 1 specifies that weights for branches emanating from nodes with numbers j, j−1, . . . , m(j)+1, need to be updated. Here, j=7 and m(j)=5, since that is the largest index l for which $t_7-t_l \geq T$. Thus, the root node 400 of the tree, numbered j−1=6, is also updated. At the root node 400, the rough prediction $y_6$ was O. Since J−O=9−14=−5 (mod 16)=11, branch 11 465 and node "11" 470 are created at the root node 400. Branch 11's 465 weight is $\min(T, t_7-t_5)=\min(2, 11-9)=\min(2, 2)=2$. At this point, the current node pointer is updated; however, the node it is updated to point to (node "13-13" 460) is a newly created node, so the current node pointer is reset to the root node 400, which is assigned number j=8.

Next, the prefetch engine requests a cache line. Since the last cache miss was line J, the rough predictor predicts line K. Since the current node pointer points to the root node 400 which has outgoing branches 0, 1, 11, and 13 each with a weight of 2, the tie break rule is used, and an address difference of 0 is used. K+0=K, so the prefetch engine requests that cache line K be prefetched. Cache line K will arrive from the main memory at time t=19+T=21. The triplet at the root node 400 (the current node) is updated to K, 11, 0. At this point, the tree looks as in FIG. 12.

At time t=21, cache line J arrives from the main memory. It is loaded into the CPU cache, whose lines are re-ordered to P, N, L, J, and the CPU is allowed to proceed. At the same time, cache line K arrives from the main memory. It is loaded into the prefetch cache, whose lines are re-ordered M, K.

At time t=22, the CPU demands cache line H. This line is not found in the CPU cache, so cache miss $x_8$ occurs at time $t'_8=22$, $t_8=12$. Since cache line H is not in the prefetch cache either, it must be loaded from main memory. A memory load request is placed on the bus, and the CPU stalls until cache line H is loaded into the CPU. Meanwhile, the tree can be updated and the prefetch engine can demand another cache line. Since the rough prediction at the current node pointer was K and cache line H was the most recent cache miss, the address difference is H−K=7−10=−3 (mod 16)=13. Branch 13's weight is incremented by $\min(T, t_8-t_7)=\min(2, 12-11)=$ min(2, 1)=1, for a total weight of 3. Since node "13" exists, the current node pointer is set to point to node "13," which is assigned number j=9.

Next, the prefetch engine requests a cache line. Since the last cache miss was line H, the rough predictor predicts line I. Since the current node pointer points to the node "13" that has one outgoing branch 13 (with a weight of 1), the address difference of 13 is used. I+13=8+13=21 (mod 16)=5=F, so the prefetch engine requests that cache line prefetched. Cache line F will arrive from the main memory at time t=22+T=24. Node "13"'s triplet (the current node) is updated to I, 12, 3. At this point, the tree looks as in FIG. 13.

This is the first prefetch initiated by the prefetch engine that will save any time since a pattern started with the CPU demanding cache line P. The prefetch engine was not able to learn the pattern until this point because the first eight cache line requests had little to do with the pattern now formed. Observe that cache line F is the next line needed (and will cause a cache miss); starting with the next CPU instruction, the prefetch engine will correctly predict the cache line needed, and in time for it to arrive when needed by the CPU.

At time t=24, cache line H arrives from the main memory. It is loaded into the CPU cache, whose lines are re-ordered to N, L, J, H, and the CPU is allowed to proceed. At the same time, cache line F arrives from the main memory. It is loaded into the prefetch cache, whose lines are re-ordered K, F.

At time t=25, the CPU demands cache line F. This line is not found in the CPU cache, so cache miss $x_9$ occurs at time $t'_9$=25, $t_9$=13. Since cache line F is already present in the prefetch cache, no demand from main memory is needed. It is loaded into the CPU cache, whose lines are re-ordered to L, J, H, F, and the prefetch cache is re-ordered to F, K. The tree is now updated to reflect the new cache miss.

Since the rough prediction at the current node pointer was I and cache line F was the next cache miss, the address difference is F−I=5−8=−3 (mod 16)=13. Node "13" has an outgoing branch 13, whose weight is incremented by min(T, $t_9-t_8$)=min(2, 13−12)=min(2, 1)=1, for a total weight of 2. Further, since the current node (j=9) is not the root node and m(j)=7, a branch emanating from the root node 400, numbered j−1=m(j)+1=8, needs to be updated. At the root node, the rough prediction $y_8$ was K. Since F−K=5−10=−5(mod 16)=11, branch 11 is incremented by min(T, $t_9-t_7$)=min(2, 13−11)=2, weight of 4. Since node "13-13" exists, the current node pointer is set to point to node "13-13," which is assigned number j=10.

Next, the prefetch engine requests a cache line. Since the last cache miss was line F, the rough predictor predicts line G. Since the current node pointer points to a node with no outgoing branches, the prefetch engine will make its prediction according to the branches out of the root node. Since branches 0 and 1 each have a weight of 2, branch 11 has a weight of 4, and branch 13 has a weight of 3, the address difference of 11 is used. G+11=6+11=17(mod 16)=1=B, so the prefetch engine requests that cache line B be prefetched. Cache line B will arrive from the main memory at time t=25+T=27. Node "13-13"'s triplet (the current node) is updated to G, 13, 2. At this point, the tree looks as in FIG. 14.

Note that the prefetch engine did not prefetch cache line D (corresponding to the branch with address difference 13), which will cause the next cache miss; instead it chose to load cache line B. By choosing to load cache line B now, the CPU will stall when cache miss D occurs, but will not stall on any of the next three instructions. If, instead, the prefetch engine had chosen to load memory D now, then B at the next cache miss, etc. (this is the behavior of a standard LZ tree predictor such as that described by Vitter), the CPU would stall for 1 clock cycle at each subsequent cache miss. This demonstrates the advantage of prefetching over ordinary LZ tree prediction.

At time t=26, the CPU demands cache line D. This line is not found in the CPU cache, so cache miss $x_{10}$ occurs at time $t'_{10}$=26, $t_{10}$=14. Since cache line D is not in the prefetch cache either, it must be loaded from main memory. A memory load request is placed on the bus, and the CPU stalls until cache line D is loaded into the CPU. Meanwhile, the tree can be updated and the prefetch engine can demand another cache line. Since the rough prediction at the current node pointer (node "13-13" 460) was G and cache line D was the most recent cache miss, the address difference is D−G=3−6=−3 (mod 16)=13. Since there is no outgoing branch 13 from node "13-13" 460, branch 13 475 and node "13-13-13" 480 are created. Branch 13 475 is given a weight of min(T, $t_{10}-t_9$)=min(2, 14−13)=min(2, 1)=1. Further, since the current node is not the root node 400, the tree's history is updated up toward the root. Here, j=10 and m(j)=8, so a branch emanating from node number j−1=9 (node "13" 450) is also updated. At node "13" 450 the rough prediction was I. Since D−I=3−8=−5 (mod 16)=11, branch 11 485 and node "13-11" 490 are created at node "13" 450. Branch 11's 485 weight is min(T, $t_{10}-t_8$)=min(2, 14−12)=min(2, 2)=2. At this point, the current node pointer is updated; however, the node it is updated to point to (node "13-13-13" 480) is a newly created node, so the current node pointer is reset to the root node 400, which is assigned number j=11.

Next, the prefetch engine requests a cache line. Since the last cache miss was line D, the rough predictor predicts line E. Since the current node pointer points to the root node 400 that has outgoing branches 0 and 1 each with a weight of 2, branch 11 with a weight of 4, and branch 13 with a weight of 3, the address difference of 11 is used. E+11=P, so the prefetch engine requests that cache line P be prefetched. Cache line P will arrive from the main memory at time t=26+T=28. The triplet at the root node 400 (the current node) is updated to E, 14, 0. At this point, the tree looks as in FIG. 15.

At time t=27, cache line B arrives from the main memory. It is loaded into the prefetch cache, whose lines are re-ordered to K, B.

At time t=28, cache line D arrives from the main memory. It is loaded into the CPU cache, whose lines are re-ordered to J, H, F, D, and the CPU is allowed to proceed. At the same time, cache line P arrives from the main memory. It is loaded into the prefetch cache, whose lines are re-ordered B, P.

At time t=29, the CPU demands cache line B. This line is not found in the CPU cache, so cache miss $x_{11}$ occurs at time $t'_{11}$=29, $t_{11}$=15. Since the prefetch cache received cache line B at time t=27, it can be transferred immediately to the CPU cache without delay. The CPU's cache's lines are re-ordered to H, F, D, B, and the CPU continues. The tree is now updated to reflect the new cache miss.

Since the rough prediction at the current node pointer was E and cache line B was the next cache miss, the address difference is B−E=1−4=−3 (mod 16)=13. The root node has an outgoing branch 13, whose weight is incremented by min(T, $t_{11}-t_{10}$)=min(2, 15−14)=min(2, 1)=1, for a total weight of 4. Since node "13" exists, the current node pointer is set to point to node "13," which is assigned the number j=12.

Next, the prefetch engine requests a cache line. Since the last cache miss was line B, the rough predictor predicts line C. Since the current node pointer points to the node "13" with outgoing branches 11 and 13 both with a weight of 2, the prefetch engine uses the tie break rule and uses an address difference of 11. C+11=N, so the prefetch engine requests that cache line N be prefetched. The request for cache line N will be completed at time t=29+T=31. Node "13" 's triplet (the current node) is updated to C, 15, 4. At this point, the tree looks as in FIG. 16.

At time t=30, the CPU demands cache line P. As this line does not exist in the CPU, cache miss $x_{12}$ occurs at time $t'_{12}$=30, $t_{12}$=16. Since the prefetch cache received cache line P at time t=28, it can be transferred immediately from the prefetch cache to the CPU cache. The CPU's cache's lines are re-ordered to F, D, B, P, and the CPU continues. The prefetch cache's lines are re-ordered to P, B. The tree is now updated to reflect the new cache miss.

Since the rough prediction at the current node pointer (node "13") was C and cache line P was the next cache miss, the address difference is P−C=15−2=13. Thus, branch 13's weight is incremented by min(T, $t_{12}$−$t_{11}$)=min(2, 16−15)= min(2, 1)=1, for a total weight of 3. Further, since j=12 and m(j)=10, a branch emanating from node number j−1=11 (the root node), is also updated. At the root node, the rough prediction was E. Since P−E=15−4=11, branch 11's weight is incremented by min(T,$t_{12}$−$t_{10}$)=min(2, 16−14)=min(2, 2)=2, for a total weight of 6. Since node "13-13" exists, the current node pointer is set to point to node "13-13," which is assigned the number j=13.

Next, the prefetch engine requests a cache line. Since the last cache miss was line P, the rough predictor predicts line A. Since the current node pointer points to node "13-13" with only outgoing branch 13 with a weight of 1, the address difference of 13 is used. A+13=N, so the prefetch engine would normally request that cache line N be prefetched. But since the prefetch engine requested cache line N at time t=29, the prefetch engine must select another line. Since there are no other outgoing branches from node "13-13," the rough predictor is used unchanged, and cache line A is requested. Using the rough predictor unchanged is only one of several implementation choices; for example, another heuristic would be to use the highest ranked difference at the root node. The request for cache line A will be completed at time t=30+T=32. Node "13-13" 's triplet (the current node) is updated to A, 16, 3. At this point, the tree looks as in FIG. 17.

At time t=31, the CPU demands cache line N. This line is not found in the CPU cache, so cache miss $x_{13}$ occurs at time $t'_{13}$=31, $t_{13}$=17. At the same time, cache line N, requested at time t=29, arrives from main memory. It is stored in the prefetch cache and immediately transferred to the CPU cache. The CPU's cache's lines are re-ordered to D, B, P, N, and the CPU continues. The prefetch cache's lines are re-ordered to N, B. The tree is now updated to reflect the new cache miss.

Since the rough prediction at the current node pointer (node "13-13") was A and cache line N was the next cache miss, the address difference is N−A=13−0=13. Branch 13's weight is incremented by min(T, $t_{13}$−$t_{12}$)=min(2, 17−16)=min(2, 1)=1, for a total weight of 2. Further, since j=13 and m(j)=11, a branch emanating from node number j−1=12 (node "13") is also updated. At node "13," the rough prediction was C. Since N−C=13−2=11, branch 11's weight is incremented by min(T, $t_{13}$−$t_{11}$)=min(2, 17−15)=min(2, 2)=2, for a total weight of 4. Since node "13-13-13" exists, the current node pointer is set to point to node "13-13-13," which is assigned number j=14.

Next, the prefetch engine requests a cache line. Since the last cache miss was line N, the rough predictor predicts line O. Since the current node pointer points to a node with no outgoing branches, the prefetch engine will make its prediction according to the branches out of the root node. Since branches 0 and 1 each have a weight of 2, branch 11 has a weight of 6, and branch 13 has a weight of 4, the address difference of 11 is used. O+11=14+11=25 (mod 16)=9=J, so the prefetch engine requests that cache line J be prefetched. (Note that, once again, the prefetch engine did not prefetch cache line L, which will cause the next cache miss; instead it chose to load cache line J. By choosing to load cache line J now, the CPU will stall when cache miss L occurs, but will not stall again for at least two instructions.) Cache line J will arrive from the main memory at time t=31+T=33. The current node's triplet is updated to O, 17, 2. At this point, the tree looks as in FIG. 18.

At time t=32, the CPU demands cache line L. This line is not found in the CPU cache, so cache miss $x_{14}$ occurs at time $t'_{14}$=32, $t_{14}$=18. Since cache line L is not in the prefetch cache either, it must be loaded from main memory. A memory load request is placed on the bus, and the CPU stalls until cache line L is loaded into the CPU. At the same time, main memory returns cache line A, requested at time t=30, which is stored in the prefetch cache. The prefetch cache's lines are re-ordered to B, A. Meanwhile, the tree can be updated and the prefetch engine can demand another cache line.

Since the rough prediction at the current node pointer (node "13-13-13") was O and cache line L was the next cache miss, the address difference is L−O=11−14=−3 (mod 16)=13. Since there is no outgoing branch 13 from node "13-13-13," branch 13 and node "13-13-13-13" are created. Branch 13 is given a weight of min(T, $t_{14}$−$t_{13}$)=min(2, 18−17)=min(2, 1)=1. Further, since j=14 and m=12, a branch emanating from node "13-13" (node number j−1= 13), is also updated. At node "13-13" the rough prediction was A. Since L−A=11−0=1, branch 11 and node "13-13-11" are created at node "13-13." Branch 11 is given a weight of min(T, $t_{14}$−$t_{12}$)=min(2, 18−16)=2. point, the current node pointer is updated; however, the node it is updated to point to (node "13-13-13-13") is a newly created node, so the current node pointer is reset to the root node, which is assigned number j=15.

Next, the prefetch engine requests a cache line. Since the last cache miss was line L, the rough predictor predicts line M. Since the current node pointer points to the root node that has outgoing branches 0 and 1 each with a weight of 2, branch 11 with a weight of 6, and branch 13 with a weight of 4, the address difference of 11 is used. M+11=12+11=23 (mod 16)=7=H, so the prefetch engine requests that cache line H be prefetched. Cache line H will arrive from the main memory at time t=32+T=34. The root node's triplet (the current node) is updated to M, 18, 0. At this point, the tree looks as in FIG. 19.

At time t=33, cache line J arrives from the main memory. It is loaded into the prefetch cache, whose lines are re-ordered to A, J.

At time t=34, cache line L arrives from the main memory. It is loaded into the CPU cache, whose lines are re-ordered to B, P, N, L, and the CPU is allowed to proceed. At the same time, cache line H arrives from the main memory. It is loaded into the prefetch cache, whose lines are re-ordered J, H.

At time t=35, the CPU demands cache line J. This line is not found in the CPU cache, so cache miss $x_{15}$ occurs at time $t'_{15}$=35, $t_{15}$=19. Since the prefetch cache received cache line J at time t=33, it can be transferred immediately from the prefetch cache to the CPU cache. The CPU's cache's lines are re-ordered to P, N, L, J, and the CPU continues. At this point, the example ends.

As a reminder to the reader, artificial assumptions used to simplify this example prevent it from fully demonstrating the advantages of prefetching.

b. Data Prefiltering

The above example showing the growth and use of the data structure within the prefetch engine 330 used a rough predictor 350 that predicted that the cache line whose address follows that of the previous observed cache miss would cause the next cache miss. The following examples further discuss the rough predictor 350 of the prefetch apparatus 300.

Consider a system with a cache line size of 2. Assume the sequence of memory references is the progression 1, 2, 3, 4, . . . The corresponding sequence of cache misses will be 1, 3, 5, . . . since the even numbered addresses are brought in to the cache together with the odd numbered addresses because the cache line size is 2. The rough predictor 350 will receive the sequence 1, 3, 5, . . . , n. The rough predictor 350 will predict the next miss to be x+cache line size or x+2. Since the rough predictor 350 guesses correctly, the address difference is 0 and the sequence of prefiltered data is 1, 0, 0, 0 . . . . (Note that the prefetch engine 330 receives more than just the prefiltered data. It also must receive the cache misses or the rough predictions, else it cannot determine the correct address to prefetch.) The initial 1 in the sequence of prefiltered data is chosen arbitrarily and assumes that, in the absence of data, the fixed predictor 350 will predict 0. Thus, the prefetch engine 330 receives as input relative patterns or relations between addresses rather than absolute addresses.

Another example of a rough predictor 350 is a linear predictor of order 2: e.g., a function that predicts the previous difference to repeat. If the previous cache misses are 1, 4, 7, 10, 14, 18, 21, 24, . . . , the rough predictor 350 will issue 0, 0, 7, 10, 13, 18, 22, 24, . . . , and the sequence of prefiltered data provided to the prefetch engine 330 is 1, 4, 0, 0, 1, 0, −1, 0 . . . . Yet another, more sophisticated, example is a rough predictor 350 that switches between different linear functions based on past performance.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for prefetching data into prefetch cache based on data compression principles, comprising:

receiving a cache miss address;

roughly predicting a first address responsive to at least the cache miss address;

generating a first address difference by taking a difference between the cache miss address and an earlier rough prediction;

generating a second address difference responsive to at least the first address difference; and adaptively prefetching a second address responsive to the second address difference and to the first address.

2. The method of claim 1 further comprising iteratively repeating the steps.

3. The method of claim 1 wherein adaptively prefetching a second address includes adding the second address difference to the first address.

4. The method of claim 1 wherein roughly predicting the first address includes adding a fixed offset to the cache miss address.

5. The method of claim 1 wherein roughly predicting the first address includes calculating the predicted address using a linear predictor of varying order.

6. The method of claim 1 wherein generating a second address difference comprises:

building a data structure in a tree form, the tree having a plurality of nodes and a plurality of branches, the plurality of nodes including a root, a plurality of internal nodes, and a plurality of leaves, the root having no incoming branch, each internal node and leaf having one incoming branch, the plurality of branches emanating from the plurality of internal nodes and the root, the leaves having no outgoing branches, each of the internal nodes and leaves having a corresponding weight for its incoming branch, the plurality of branches being representative of corresponding address differences, and the tree having a pointer pointing to a current node in the tree;

receiving the first address difference;

updating the weight of branches on the tree emanating from nodes on a path from the current node up toward the root;

traversing the tree in the direction of the first address difference until reaching a new current node;

assigning the pointer to point to the new current node;

ranking the branches on the new current node according to the weight; and generating the second address difference responsive to the rank on the branches on the new current node.

7. The method of claim 6 wherein:

ranking the branches on the new current node includes identifying a branch with a highest rank; and generating the second address difference includes generating the second address difference associated with a branch with the highest rank emanating from the new current node.

8. The method of claim 6 wherein generating the second address difference includes generating a plurality of address differences associated with branches emanating from the new current node.

9. The method of claim 6 wherein:

ranking the branches on the new current node includes identifying the branches with highest ranks; and generating the second address difference includes generating a plurality of address differences associated with branches with the highest ranks emanating from the new current node.

10. The method of claim 6 wherein:

ranking the branches on the new current node includes identifying the branches with highest ranks; and generating the second address difference includes generating the second address difference associated with a branch not having a highest rank emanating from the new current node when the second address responsive to a different second address difference associated with a branch with the highest rank emanating from the new current node and to the first address is already in the prefetch cache or a central processing unit cache, or was previously requested and on its way to the caches.

11. The method of claim 6 wherein updating the weight of branches on the tree includes:

assigning an incremental numerical index j, $j \geq 0$, to the cache miss address $x_j$;

assigning the incremental numerical index j to the current node of the tree;

determining a time $t_j$ at which the cache miss address $x_j$ occurred; and incrementing the weight of one branch emanating from each node associated with the indices j−i by an increment amount, where $0 \leq i < j - m(j)$, m(j) is a largest index l that satisfies $t_j - t_l \geq T$, and T is a memory latency for the system architecture in which the method for prefetching data into a prefetch cache is implemented, stopping if the root of the tree is encountered.

12. The method of claim 11 wherein updating the weight of branches on the tree further includes:

associating to the current node the first address $y_j$ roughly predicted responsive to the first j cache miss addresses $x_0, x_1, \ldots, x_{j-1}$; and incrementing the weight of the branch representing an address difference $x_j - y_{j-i}$ emanating from each node with index j−i.

13. The method of claim 12 wherein the increment amount for the node with the index j−i is given by min(T, $t_j - t_{j-i-1}$).

14. The method of claim 12 wherein the increment amount for the node with the index j−i is given by min(T, $t_j - t_{j-i-1}) - t_j + t_{k'(i, j)-1}$, where k'(i,j) is the smallest index of a node with index greater than j−i such that the address difference corresponding to the branch with the highest rank is $x_j - y_{j-i}$, or j+1 if no such node exists.

15. The method of claim 11 where the time $t_j$ at which the cache miss address $x_j$ occurred is measured in central processing unit cycles not including stall times.

16. The method of claim 15, wherein k'(i,j) is the smallest index of a node with index greater than j−i such that the address difference corresponding to the branch with the highest rank is $x_j - y_{j-i}$, based on the weights that are available after the cache miss address $x_j$ occurs, or j+1 if no such node exists.

17. The method of claim 6 wherein ranking the branches on the new current node includes:

identifying all branches emanating from the new current node;

identifying all nodes with incoming branches emanating from the new current node;

determining the corresponding weight for each branch emanating from the new current node; and ranking the branches emanating from the new current node according to their corresponding weights.

18. The method of claim 17 wherein ranking the branches emanating from the new current node includes ranking the branches in descending order responsive to the weights.

19. The method of claim 6 wherein the method includes a reset function to reset the data structure in tree form.

20. The method of claim 19 wherein the reset function includes adjusting the weights of all branches in the tree after the reset.

21. The method of claim 6 wherein traversing the tree includes moving from the new current node to an alternate new current node when the new current node is a leaf, the alternate new current node being found by traversing from the root parallel to a suffix of a path from the root to the new current node.

22. The method of claim 1 wherein the second address difference is assigned a reliability.

23. The method of claim 22 further comprising not adaptively prefetching a second address if the reliability of the second address difference is below a threshold reliability.

24. The method of claim 1 further comprising using the prefetch cache as a victim cache to receive data from a central processing unit cache.

25. A system for prefetching data using data compression principles, comprising:

means for receiving a cache miss address;

means for roughly predicting a first address responsive to at least the cache miss address;

means for generating a first address difference by taking a difference between the cache miss address and an earlier rough prediction;

means for generating a second address difference responsive to at least the first address difference; and means for adaptively prefetching a second address responsive to the second address difference and to the first address.

26. The system of claim 25 further comprising means for iteratively repeating the steps.

27. The system of claim 25 wherein the means for adaptively prefetching a second address includes means for adding the second address difference to the first address.

28. The system of claim 25 wherein the means for roughly predicting the first address includes means for adding a fixed offset to the cache miss address.

29. The system of claim 25 wherein the means for roughly predicting the first address includes means for calculating the predicted address using a linear predictor of varying order.

30. The system of claim 25 wherein the means for generating a second address difference comprises:

means for building a data structure in a tree form, the tree having a plurality of nodes and a plurality of branches, the plurality of nodes including a root, a plurality of internal nodes, and a plurality of leaves, the root having no incoming branch, each internal node and leaf having one incoming branch, the plurality of branches emanating from the plurality of internal nodes and the root, the leaves having no outgoing branches, each of the nodes having a corresponding weight for its incoming branch, the plurality of branches being representative of corresponding address differences, and the tree having a pointer pointing to a current node in the tree;

means for receiving the first address difference;

means for updating the weight of branches on the tree emanating from nodes on a path from the current node up toward the root;

means for traversing the tree in the direction of the first address difference until reaching a new current node;

means for assigning the pointer to point to the new current node;

means for ranking the branches on the new current node according to the weight; and means for generating the second address difference responsive to the rank on the branches on the new current node.

31. The system of claim 30 wherein:

the means for ranking the branches on the new current node includes means for identifying a branch with a highest rank; and the means for generating the second address difference includes means for generating the second address difference associated with a branch with the highest rank emanating from the new current node.

32. The system of claim 30 wherein the means for generating the second address difference includes means for generating a plurality of address differences associated with branches emanating from the new current node.

33. The system of claim 30 wherein:

the means for ranking the branches on the new current node includes means for identifying the branches with highest ranks; and the means for generating the second address difference includes means for generating a plurality of address differences associated with branches with the highest ranks emanating from the new current node.

34. The system of claim 30 wherein:
the means for ranking the branches on the new current node includes means for identifying the branches with highest ranks; and
the means for generating the second address difference includes means for generating the second address difference associated with a branch not having a highest rank emanating from the new current node when the second address responsive to a different second address difference associated with a branch with the highest rank emanating from the new current node and to the first address is already in the prefetch cache or a central processing unit cache, or was previously requested and on its way to the caches.

35. The system of claim 30 wherein the means for updating the weight of branches on the tree includes:
means for assigning an incremental numerical index $j, j \geq 0$, to the cache miss address $x_j$;
means for assigning the incremental numerical index j to the current node of the tree;
means for determining a time $t_j$ at which the cache miss address $x_j$ occurred; and
means for incrementing the weight of one branch emanating from each node associated with the indices j–i by an increment amount, where $0 \leq i < j - m(j)$, m(j) is a largest index l that satisfies $t_j - t_l \geq T$, and T is a memory latency for the system architecture in which the method for prefetching data into a prefetch cache is implemented, stopping if the root of the tree is encountered.

36. The system of claim 35 wherein the means for updating the weight of branches on the tree further includes:
means for associating to the current node the first address $y_j$ roughly predicted responsive to the first j cache miss addresses $x_0, x_1, \ldots, x_{j-1}$; and
means for incrementing the weight of the branch representing an address difference $x_j - y_{j-i}$ emanating from each node with index j–i.

37. The system of claim 36 wherein the means for the increment amount for the node with the index j–i is given by $\min(T, t_j - t_{j-i-1})$.

38. The system of claim 36 wherein the means for the increment amount for the node with the index j–i is given by $\min(T, t_j - t_{j-i-1}) - t_j + t_{k'(i,j)-1}$, where k'(i,j) is the smallest index of a node with index greater than j–i such that the address difference corresponding to the branch with the highest rank is $x_j - y_{j-i}$, or j+1 if no such node exists.

39. The system of claim 35 where the time $t_j$ at which the cache miss address $x_j$ occurred is measured in central processing unit cycles not including stall times.

40. The system of claim 39, wherein k'(i,j) is the smallest index of a node with index greater than j–i such that the address difference corresponding to the branch with the highest rank is $x_j - y_{j-i}$, based on the weights that are available after the cache miss address $x_j$ occurs, or j+1 if no such node exists.

41. The system of claim 35 wherein the second address difference is assigned a reliability.

42. The system of claim 41 further comprising means for not adaptively prefetching a second address if the reliability of the second address difference is below a threshold reliability.

43. The system of claim 30 wherein the means for ranking the branches on the new current node includes:
means for identifying all branches emanating from the new current node;
means for identifying all nodes with incoming branches emanating from the new current node;
means for determining the corresponding weight for each branch emanating from the new current node; and
means for ranking the branches emanating from the new current node according to their corresponding weights.

44. The system of claim 43 wherein the means for ranking the branches emanating from the new current node includes means for ranking the branches in descending order responsive to the weights.

45. The system of claim 30 wherein the system includes a reset function to reset the data structure in tree form.

46. The system of claim 45 wherein the reset function includes means for adjusting the weights of all branches in the tree after the reset.

47. The system of claim 30 wherein the means for traversing the tree includes means for moving from the new current node to an alternate new current node when the new current node is a leaf, the alternate new current node being found by traversing from the root parallel to a suffix of a path from the root to the new current node.

48. The system of claim 25 further comprising means for using the prefetch cache as a victim cache to receive data from a central processing unit cache.

49. A method for optimizing computer system performance by observing a sequence of outcomes $x_j$ and taking actions $b_j$ that sequentially minimize a loss function L, where $x_j$ is a $j^{th}$ outcome that has occurred, $b_j$ is a $j^{th}$ action taken and depending on the j outcomes $x_0, x_1, \ldots, x_{j-1}$, the possible actions being in one-to-one correspondence with the possible outcomes, the loss function L being an accumulation of losses with respect to individual actions in accordance with $$L = \sum_{j=0}^{n} L(x_j)$$

$$L(x_j) = \sum_{i=0}^{sl(j)-1} C_i(b_{j-i}, x_j)$$

where sl(j) is the number of past actions contributing to the loss caused by $x_j$, $sl(j) \leq j$, each action $b_{j-i}$ contributing a loss $C_i(b_{j-i}, x_j)$, and n is the total number of outcomes, the method comprising:
receiving the outcome $x_j$; and
taking an action $b_{j+1}$ responsive to the j+1 outcomes $x_0, x_1, \ldots, x_j$ designed to minimize the loss function L.

50. The method of claim 49 wherein taking an action $b_{j+1}$ responsive to the j+1 outcomes $x_0, x_1, \ldots, x_j$ includes:
roughly predicting an outcome $y_j$ responsive to previous outcomes $x_0, x_1, \ldots, x_{j-1}$;
generating a difference between the outcome $x_j$ and the roughly predicted outcome $y_j$;
constructing a data structure in tree form, the tree having a plurality of nodes and a plurality of branches, the plurality of nodes including a root, a plurality of internal nodes, and a plurality of leaves, the root having no incoming branch, each internal node and leaf having one incoming branch, the plurality of branches emanating from the plurality of internal nodes and the root, the leaves having no outgoing branches, each of the nodes having a corresponding weight for its incoming branch, the plurality of branches being representative of a difference between an outcome and a roughly predicted outcome, and the tree having a pointer pointing to a current node in the tree;

receiving the outcome $x_j$ with the pointer pointing to the current node;

updating the weight of branches on the tree emanating from nodes on a path from the current node up toward the root;

traversing the tree in the direction of the difference $x_j-y_j$ until reaching a new current node;

assigning the pointer to point to the new current node;

ranking the branches on the new current node responsive to the weight; and taking the action $b_{j+1}$ responsive to the rank on the branches emanating from the new current node.

51. The method of claim 50 wherein $$C_i(b_{j-i}, x_j) = \begin{cases} 0 & \text{for some } b^*, \text{ a function of } x_j \\ C_i(t_1, t_2, \ldots, t_j) & \text{otherwise} \end{cases}$$

where $C_i$ represents a loss function, $b^*$ is a unique action relative to an outcome $x_j$ and $t_0, t_1, \ldots, t_j$ represent side information.

52. The method of claim 51 wherein updating branches on the tree includes:

associating an index j to the current node; and incrementing the weight of one branch emanating from each node associated with indices j–i by an increment amount, where $0 \leq i < sl(j)$, stopping if the root of the tree is encountered.

53. The method of claim 52 wherein incrementing the weight of one branch emanating from each node having the indices j–i by an increment amount includes incrementing the weight of the branch associated with a difference $z_j-y_j$ by an amount $C_i(t_0, t_1, t_2, \ldots, t_j)$, where $z_j$ is the outcome corresponding to the action b* in the one-to-one correspondence between actions and outcomes.

54. The method of claim 53 wherein the computer system performance to be optimized is for prefetching of data into a prefetch cache, where the increment amount $C_i(t_0, t_1, t_2, \ldots, t_j)$ is given by $\min(T, t_j-t_{j-i-1})$, T is a memory latency for the computer system, the side information $t_l$, $0 \leq l \leq j$, is a time not including stall times at which an outcome $x_l$ occurs in central processing unit cycles, sl(j) is given by j−m(j), and m(j) is a maximum index l that satisfies $t_j-t_l \geq T$.

55. The method of claim 51 wherein ranking the branches on the new current node includes:

identifying all branches emanating from the new current node;

identifying all nodes with incoming branches emanating from the new current node;

determining the corresponding weight for each branch emanating from the new current node; and ranking the branches emanating from the new current node according to their corresponding weights.

56. The method of claim 55 wherein ranking the branches emanating from the new current node includes ranking the branches in descending order responsive to the weights.

57. The method of claim 50 wherein the method includes a reset function to reset the data structure in tree form.

58. The method of claim 57 wherein the reset function includes adjusting the weights of all branches in the tree after the reset.

59. The method of claim 50 wherein traversing the tree includes:

identifying the branch emanating from the current node corresponding to the difference between the outcome $x_j$ and the roughly predicted outcome $y_j$; and moving along the identified branch to the new current node.

60. The method of claim 50 wherein traversing the tree includes moving from the new current node to an alternate new current node when the new current node is a leaf, the alternate new current node being found by traversing from the root parallel to a suffix of a path from the root to the new current node.

61. The method of claim 50 wherein:

the method further includes ranking the branches on the new current node; and taking an action responsive to the branches includes taking an action responsive to the rank of the branches emanating from the new current node.

62. The method of claim 61 wherein taking an action responsive to the rank on the branches includes taking an action associated with a branch emanating from the new current node with a highest rank.

63. The method of claim 62 wherein taking an action associated with a branch emanating from the new current node with the highest rank includes:

roughly predicting a first outcome $y_{j+1}$ responsive to previous outcomes $x_0, x_1, \ldots, x_j$;

generating a second outcome by adding to the first outcome $y_{j+1}$ a difference corresponding to a branch emanating from the new current node with a highest rank; and taking an action corresponding to the second outcome in the one-to-one correspondence between actions and outcomes.

64. The method of claim 61 wherein taking an action responsive to the rank on the branches further includes taking a plurality of actions associated with branches emanating from the new current node.

65. The method of claim 61 wherein taking an action responsive to the rank on the branches further includes taking a plurality of actions associated with branches emanating from the new current node with highest ranks.

66. The method of claim 65 wherein taking a plurality of actions associated with branches emanating from the new current node with highest ranks includes:

roughly predicting a first outcome $y_{j+1}$ responsive to previous outcomes $x_0, x_1, \ldots, x_j$;

generating multiple outcomes by adding to the first outcome $y_{j+1}$ a difference corresponding to branches emanating from the new current node with highest ranks; and taking actions corresponding to the multiple outcomes in the one-to-one correspondence between actions and outcomes.

67. The method of claim 49 wherein the branches emanating from the new current node are each assigned a reliability.

68. The method of claim 67 further comprising not taking the action $b_{j+1}$ if the reliability of each branch emanating from the new current node is below a threshold reliability.

* * * * *